(12) United States Patent
Su et al.

(10) Patent No.: US 12,176,541 B2
(45) Date of Patent: Dec. 24, 2024

(54) ELECTROACTIVE MATERIALS FOR SECONDARY BATTERIES

(71) Applicant: UCHICAGO ARGONNE, LLC, Chicago, IL (US)

(72) Inventors: Chi Cheung Su, Westmont, IL (US); Jiayan Shi, Woodridge, IL (US); Rachid Amine, Bolingbrook, IL (US); Khalil Amine, Oakbrook, IL (US)

(73) Assignee: UChicago Argonne, LLC, Chicago, IL (US)

( * ) Notice: Subject to any disclaimer, the term of this patent is extended or adjusted under 35 U.S.C. 154(b) by 237 days.

(21) Appl. No.: 17/592,635

(22) Filed: Feb. 4, 2022

(65) Prior Publication Data

US 2023/0253563 A1    Aug. 10, 2023

(51) Int. Cl.
    *H01M 4/60*    (2006.01)
    *H01M 10/0569*  (2010.01)

(52) U.S. Cl.
    CPC ........ *H01M 4/606* (2013.01); *H01M 10/0569* (2013.01); *H01M 2300/0037* (2013.01)

(58) Field of Classification Search
    CPC ............. H01M 4/606; H01M 10/0569; H01M 2300/0037
    See application file for complete search history.

(56) References Cited

U.S. PATENT DOCUMENTS

| | | | |
|---|---|---|---|
| 10,147,950 B2 | 12/2018 | Sakshaug et al. | |
| 2008/0171265 A1* | 7/2008 | Iriyama | H01M 4/1399 427/77 |
| 2012/0021273 A1* | 1/2012 | Ohmori | H01M 4/662 429/144 |
| 2012/0196182 A1* | 8/2012 | Yao | H01M 4/606 568/377 |
| 2012/0321940 A1* | 12/2012 | Kawasaki | H01M 50/121 429/163 |
| 2017/0162862 A1* | 6/2017 | Thielen | H01M 4/136 |
| 2018/0108911 A1* | 4/2018 | Schubert | C08F 12/32 |
| 2020/0109228 A1* | 4/2020 | Stewart | C08G 75/0204 |
| 2020/0176762 A1* | 6/2020 | Sun | H01M 4/366 |

(Continued)

FOREIGN PATENT DOCUMENTS

CN    112940156 A  *  6/2021  ............... C08F 8/00

OTHER PUBLICATIONS

Vermaas, J., et al., "Molecular lignin solubility and structure in organic solvents", ACS Sustabinable Chem. Eng., 8, pp. 17839-17850. (Year: 2020).*

(Continued)

*Primary Examiner* — Matthew T Martin
*Assistant Examiner* — Katherine N Higgins
(74) *Attorney, Agent, or Firm* — Foley & Lardner LLP

(57) ABSTRACT

An electrochemical cell includes an anode that includes silicon, a conductive carbon, a lithium titanate, lithium metal, or a combination of any two or more thereof; a separator; a cathode having a cathode active material and a redox active species either mixed into the cathode or coated onto the cathode; and an electrolyte that includes a salt; and an aprotic solvent comprising a fluorinated ether solvent, a carbonate solvent, or a mixture thereof, with the proviso that the redox active species has substantially no solubility in the electrolyte. The redox active species may be a redox active organic compound or polymer.

14 Claims, 9 Drawing Sheets

(56) References Cited

U.S. PATENT DOCUMENTS

| | | | |
|---|---|---|---|
| 2022/0037650 A1* | 2/2022 | Kim | H01M 4/606 |
| 2022/0102758 A1* | 3/2022 | Locke | H01M 4/622 |
| 2023/0036848 A1* | 2/2023 | Khan | H01M 10/36 |

OTHER PUBLICATIONS

Song et al. "A quinone-based oligomeric lithium salt for superior Liaorganic batteries." Energy Environ. Sci., 2014, 7, 4077 (Year: 2014).*

English Machine Translation for CN-112940156-A (Year: 2021).*

Chen et al. "Redox polymers for rechargeable metal-ion batteries." EnergyChem, vol. 2, Issue 2, May 2020 (Year: 2020).*

Song et al. "A quinone-based oligomeric lithium salt for superior Li-organic batteries." Energy Environ. Sci., 2014, 7, 4077 (Year: 2014).*

Sieuw et al. "Through-Space Charge Modulation Overriding Substituent Effect: Rise of the Redox Potential at 3.35 V in a Lithium-Phenolate Stereoelectronic Isomer." Chem. Mater. 2020, 32, 23, 9996a10006. Nov. 2020 (Year: 2020).*

* cited by examiner

ELECTROACTIVE MATERIALS FOR SECONDARY BATTERIES

GOVERNMENT RIGHTS

This invention was made with government support under Contract No. DE-AC02-06CH11357 awarded by the United States Department of Energy to UChicago Argonne, LLC, operator of Argonne National Laboratory. The government has certain rights in the invention.

FIELD

The present technology is generally related to secondary batteries. More particularly, the technology is related to electroactive materials that containing lithium or sodium for pre-lithiation or pre-sodiation.

SUMMARY

In one aspect, an electrochemical cell includes an anode comprising silicon, a conductive carbon, a lithium titanate, lithium metal, or a combination of any two or more thereof; a separator; a cathode comprising a cathode active material and a redox active species either mixed into the cathode or coated onto the cathode; and an electrolyte comprising: a salt; and an aprotic solvent comprising a fluorinated ether solvent, a carbonate solvent, or a mixture thereof, with the proviso that the redox active species has substantially no solubility in the electrolyte.

In any embodiments herein, the redox active species is mixed into a bulk of the cathode active material, comprises a coating on the surface of the cathode active material, or is both mixed into the bulk of the cathode active material and comprises a coating on the surface of the cathode active material. In any embodiments, the redox active species may be a redox active organic compound, or a redox active polymer. In some embodiments, the redox active polymer is lignin.

In another aspect, a method of prelithiating an electrochemical cell is provided, the method comprising: providing an electrochemical cell comprising a cathode comprising a cathode active material and a redox active species either mixed into the cathode or coated onto the cathode; and subjecting the electrochemical cell to a charging current.

DETAILED DESCRIPTION

Figure 1A:
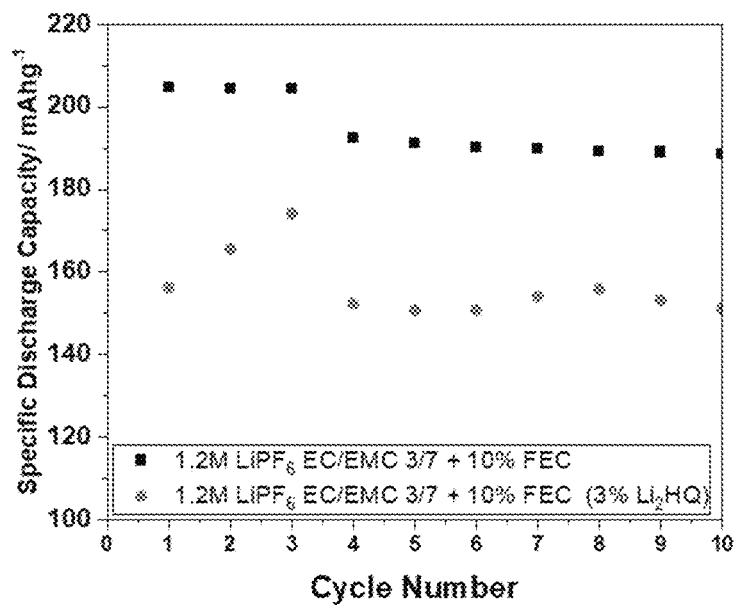
FIGS. 1A-1B include graphs of the (A) cycling performance and (B) coulombic efficiency of baseline (Li∥NMC) and Li∥Li$_2$HQ-NMC cells using conventional electrolyte (1.2M LiPF$_6$ in 3:7 EC-EMC solution with 10% FEC), according to the examples.
Figure 1B:
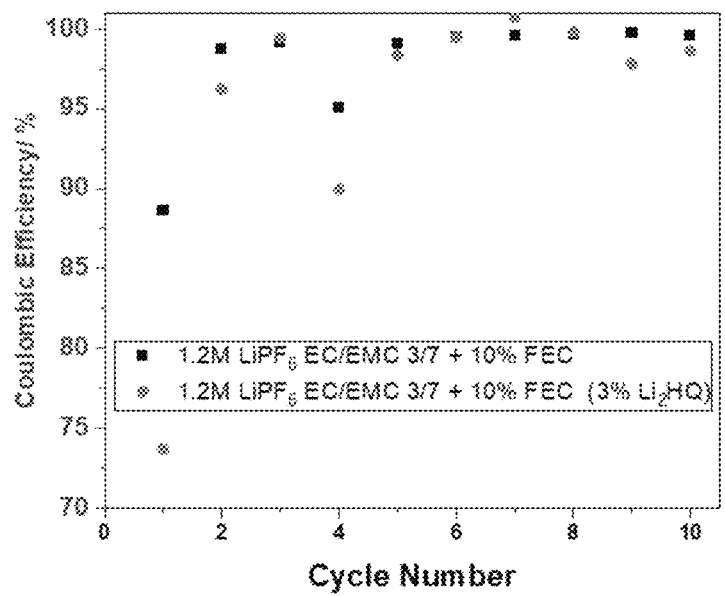
Figure 2A:
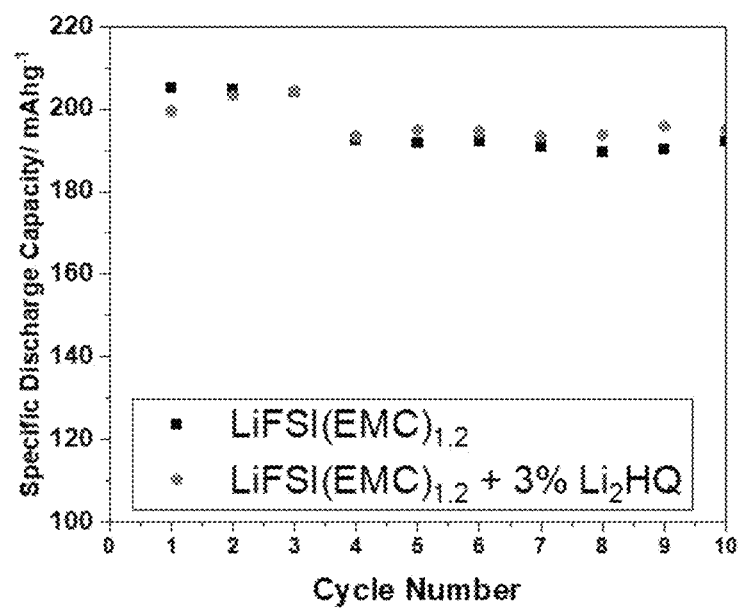
FIGS. 2A-2B include graphs of the (A) cycling performance and (B) Coulombic efficiency of baseline (Li∥NMC) and Li∥Li$_2$HQ-NMC cells using weakly solvating concentrated electrolyte (LiFSI:EMC 1:1.2, molar ratio), according to the examples.
Figure 2B:
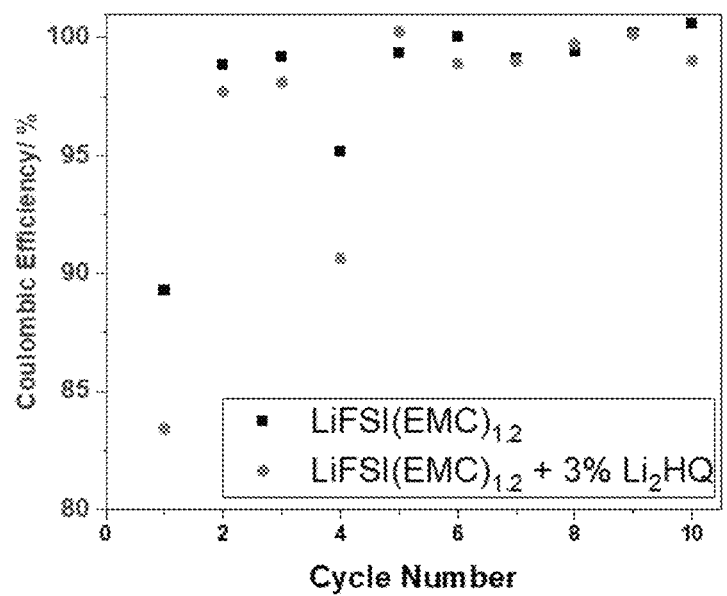

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As utilized herein with respect to numerical ranges, the terms "approximately," "about," "substantially," and similar terms will be understood by persons of ordinary skill in the art and will vary to some extent depending upon the context in which it is used. If there are uses of the terms that are not clear to persons of ordinary skill in the art, given the context in which it is used, the terms will be plus or minus 10% of the disclosed values. When "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=$CH_2$, C=$CH_2$, or C=$CHCH_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

To meet the power and energy requirements for all-electric vehicles, there is a need for higher energy density chemistries that could be applied in batteries. The state-of-the-art battery technology is not able to meet the energy density requirement set by the electric vehicle market. Pre-lithiation is a useful strategy to increase the energy density of batteries by mitigating the loss of activated lithium due to the formation of solid electrolyte interphase during the first cycle and during the subsequent cycling cycles.

Described herein are electrochemical cells in which redox active species are incorporated into, or onto, a cathode of the electrochemical cell for pre-lithiation or pre-sodiation of the cell. As used herein, the term "redox active species" does not include the metal oxides or other materials that form the cathode active and anode active materials. Instead, the redox active species are either small organic molecules that have substantially no solubility in the electrolyte solvent (typically an aprotic solvent) of choice, or they are polymeric species that likewise have little to no solubility in the electrolyte solvent. The redox active species are typically organic-based materials that may be lithiated or sodiated, or unlithiated or unsodiated but which are amenable to lithiation and sodiation by the salt present the electrolyte. Upon charging and discharging, the redox active species provides the metal (lithium or sodium) to the cathode, or absorbs the metal (lithium or sodium), to facilitate the charge and discharge process. Further, redox active species can be oxidized on cathode, supplying extra capacity that can partially replace the relatively expensive layered oxide cathode, provided that the reduction potential of the redox active species is below the lower cutoff voltage for the cell. The use of low solubility electrolytes suppresses the dissolution of small redox organic molecules that causes shuttling effects. The redox active species provide a pathway for successful pre-lithiation of lithium batteries through the oxidation of the redox organic molecules on cathode. The polymeric redox active species are typically insoluble in the electrolytes and therefore the concern with regard to dissolution of these materials is minimal. Pre-lithiation is a useful strategy to increase the energy density of batteries by replacing lithium and/or mitigating the loss of lithium due to the formation of solid electrolyte interphase during the first, subsequent, cycles.

In one aspect, an electrochemical cell is provided having an anode, a separator, and a cathode, where the cathode includes a cathode active material and a redox active species either mixed into the cathode or coated onto the cathode. The cell also includes an electrolyte that has at least a salt and an aprotic solvent, where the aprotic solvent either as the solvent or in combination with a high concentration of the salt provides for substantially no dissolution of the redox active species from the cathode in either a reduce or an oxidized state. In some embodiments, the aprotic solvent is a fluorinated ether solvent, a carbonate solvent, or a mixture thereof. In some embodiments, the redox active species is (i) mixed into a bulk of the cathode active material, (ii) is present as a coating on the surface of the cathode active material, or (iii) both.

Small Molecule Organic Redox Species

Where the redox active species is a small molecule organic compound, it may be (2,2,6,6-tetramethylpiperidin-1-yl)oxyl or a derivative thereof, (2,2,6,6-tetramethylpiperidin-1-yl)oxidanyl or a derivative thereof, 2,2,5,5-tetramethylpyrrolidine-N-oxyl nitroxide or a derivative thereof, a 1,4-dialkoxybenzene, a quinoxaline, a dipyridylketone, a catechol phenylborate ester, a viologen, an amino-substituted cyclopropenium salt, or a mixture of any two or more thereof. Illustrative examples of such compounds may be represented by any one or more of the following formulae:

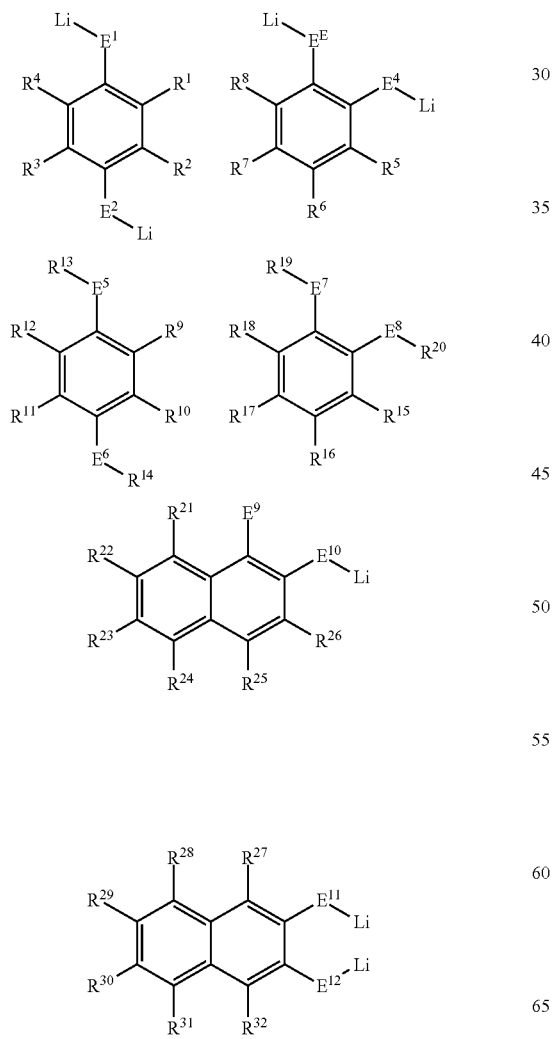

-continued

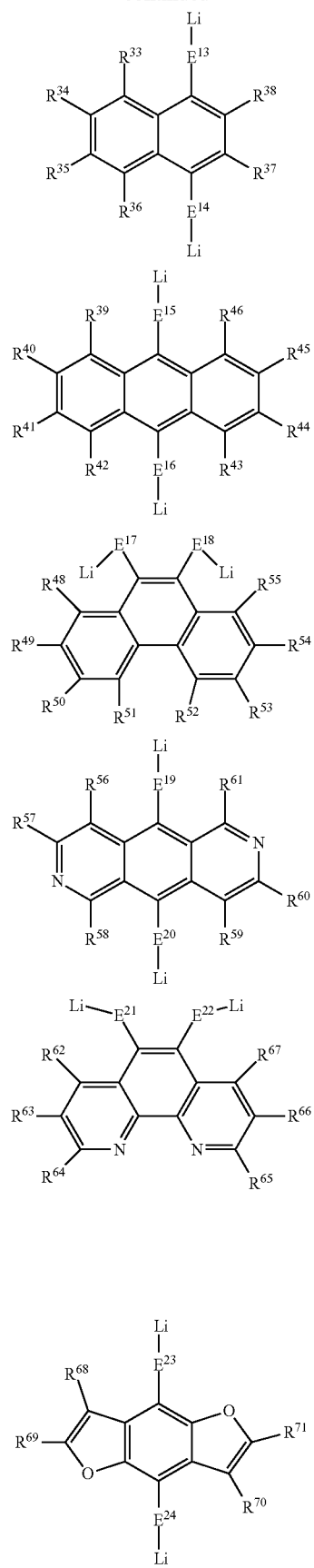

-continued

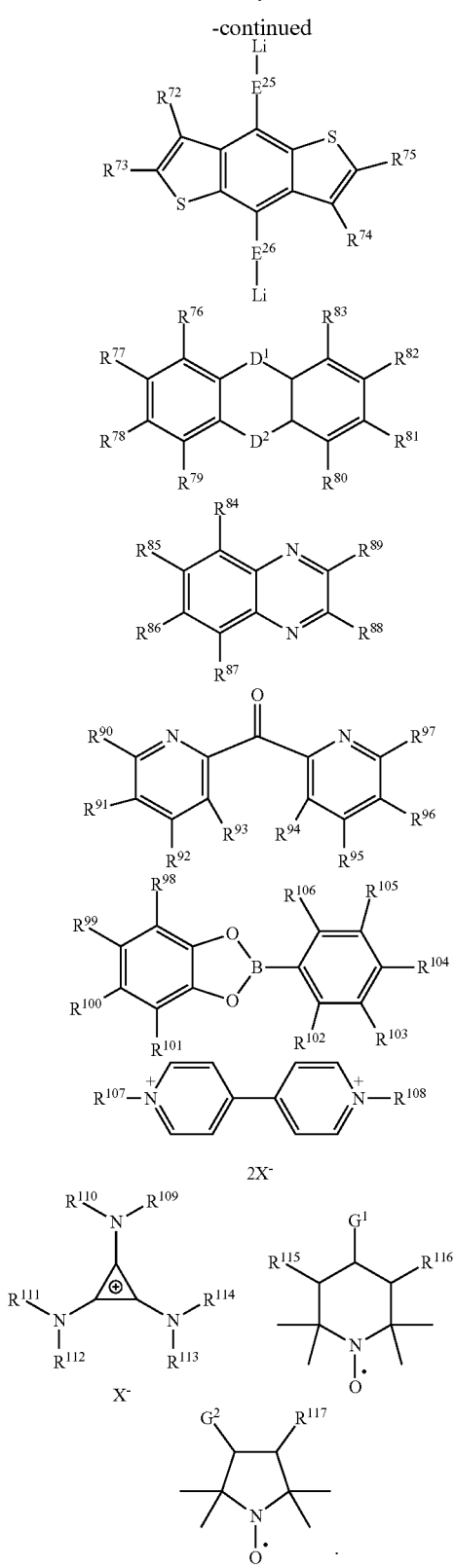

In the above formulae, each of $R^1$-$R^{106}$ and $R^{115}$-$R^{117}$ is independently H, NO, F, Cl, Br, I, alkyl, alkoxy, haloalkyl, heteroalkyl, aryl, alkenyl, alkynyl, N(R), OP(R), OP(OR), C(O)R, C(O)OR, S(O)OR, or S(O)R; R is alkyl; R' is H, NO, F, Cl, Br, I, alkyl, alkoxy, haloalkyl, heteroalkyl, aryl, alkenyl, or alkynyl group; each of $R^{107}$-$R^{114}$ is independently H, alkyl, haloalkyl, heteroalkyl, aryl, alkenyl, alkynyl, C(O)R, or C(O)OR; each of $D^1$ and $D^2$ is independently O, S, S—O, S(=O), Se, NR', or PR'; each of $E^1$-$E^{26}$ is independently O, S, S—O, S(=O), Se, NR', or PR'; each of $G^1$ and $G^2$ is H, OH, C=O, NO, F, Cl, Br, I, alkyl, alkoxy, haloalkyl, heteroalkyl, aryl, alkenyl, alkynyl, N(R), OP(R), OP(OR), C(O)R, C(O)OR, S(O)OR, or S(O)R; and $X^-$ is an anion selected from the group consisting of $F^-$, $Cl^-$, $Br^-$, $I^-$, bis(trifluoromethanesulfonyl)imide, tetrafluoroborate, hexafluorophosphate, alkylsulfonylimide, fluoroalkylsulfonylimide, sulfonylimide, fluorosulfonylimide, fluoroalkylsulfonate, alkylsulfonate, bis(oxalate)borate, fluoro(oxalate)borate, fluoro(oxalate)phosphate, tris(oxalate)phosphate, and perchlorate.

Polymeric Redox Species

Where the redox active species is a polymer, other possibilities are opened. For example, due to the natural insolubility of such polymers, the solvation of an electrolyte solvent with respect to the redox active species is much less of a concern, and additionally, when mixed with the cathode active material, such polymers may act as a binder in the cathode, thereby eliminating or reducing the amount of binder required.

Suitable redox polymers may be an organic macromolecule (average $M_n$>1000 Da) having a conjugated unsaturated moiety, a boron cluster compound, or a combination thereof. The conjugated unsaturated moiety may be aromatic, non-aromatic, or a combination thereof, and can include carbon-carbon unsaturated bonds, carbon-heteroatom unsaturated bonds, or a combination of carbon-carbon and carbon-heteroatom unsaturated bonds. The heteroatom of any carbon-heteroatom bond is a non-metallic heteroatom (e.g., N, O, S) or a metalloid heteroatom.

In some embodiments, the redox polymer includes a lithiated redox active polymer or copolymer. After the lithiated redox active polymer oxidizes on the positive electrode, lithium cations diffuse into the electrolyte while the oxidized redox polymer stays inert on the cathode. During this process, lithium cations on the anode will be reduced and the recyclable lithium reservoir will be replenished. Examples of lithiated redox active polymers include, but are not limited to, lithiated polyhydroquinone and its derivatives, lithiated polycatechol and its derivatives, lithiated polyaniline and its derivatives, lithiated polydopamine and its derivatives.

In some embodiments, the redox polymer includes non-lithiated redox active polymers or copolymers. After the non-lithiated redox active polymer is oxidized on the positive electrode, it remains on the cathode. To balance the charge, lithium cations from the electrolyte may be reduced on the anode and the recyclable lithium reservoir will be replenished. Illustrative examples of non-lithiated redox active polymers include, but are not limited to, lignin, poly(2,2,6,6-tetramethylpiperidin-1-yl)oxyl or poly(2,2,5,5-tetramethyl-1-pyrrolidinyl)oxy and their derivatives, poly(2,2,5,5-tetramethylpyrrolidine-N-oxyl) nitroxide and its derivatives, poly(1,4-dialkoxy)benzene and its derivatives, polyquinoxaline and its derivatives, polydipyridylketone and its derivatives, polycatechol phenylborate ester, polyviologen and its derivatives and polyamino-substituted cyclopropenium salts, and the like.

In some embodiments, the redox polymer component on the positive electrode comprises natural occurring or synthetic polyphenols including but not limited to lignin, tannic acid, ellagitannin, tannin. Illustrative redox polymers may also include polymeric backbones (e.g., polyolefins, poly-esters, polyacylates, poly(meth)acrylates, polycarbonates, etc.) with pendent groups that include those small molecule redox active species described above. For example, the polymer may be represented as one or more of the following formulae:
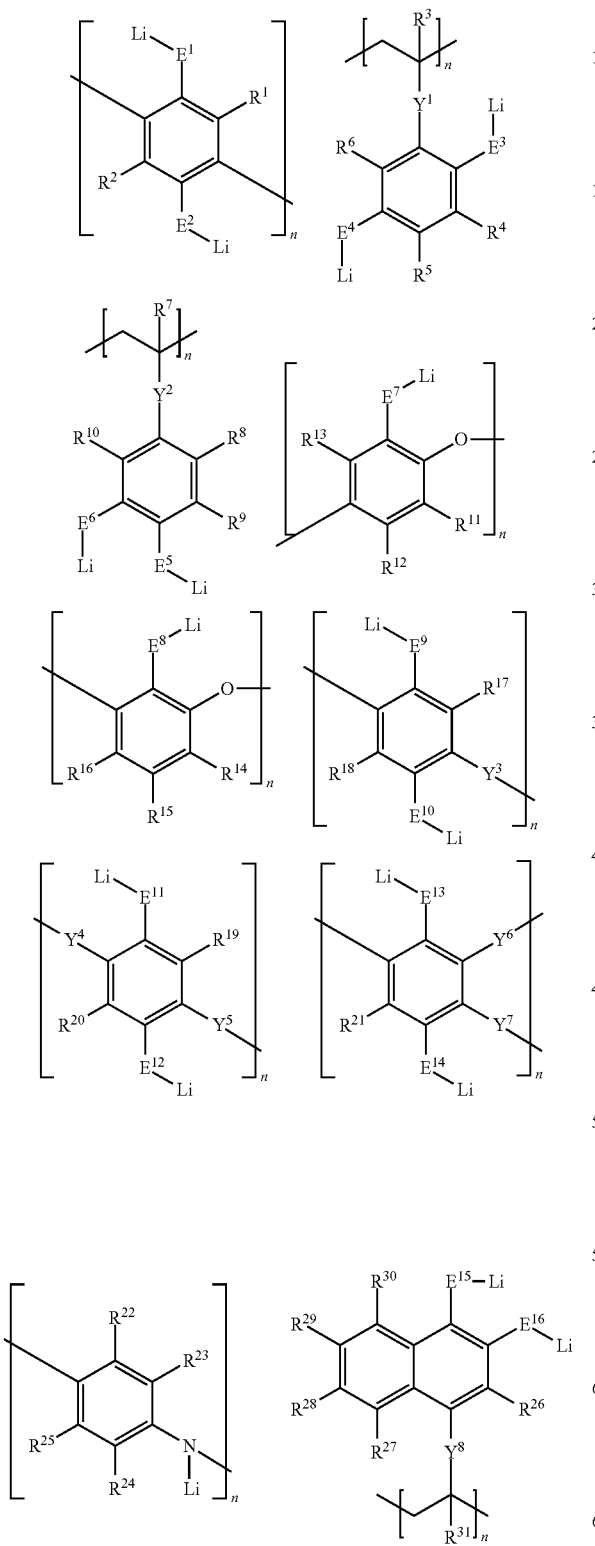
-continued
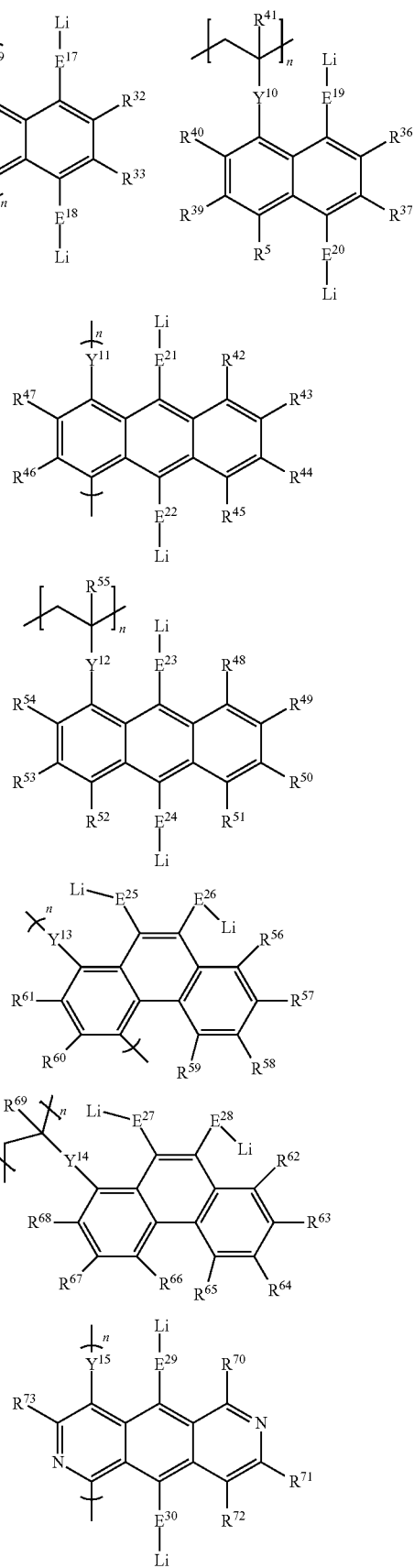

-continued

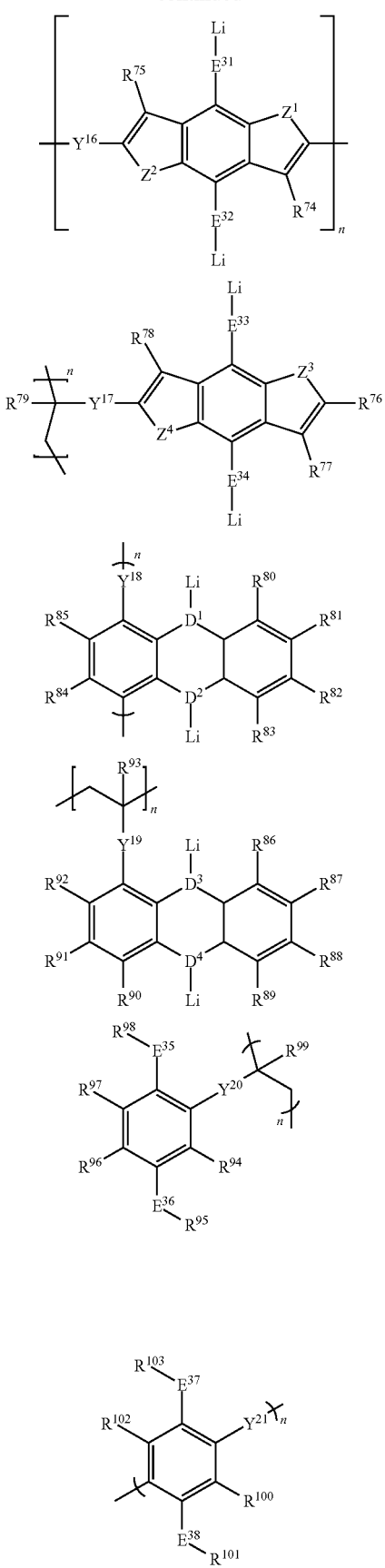

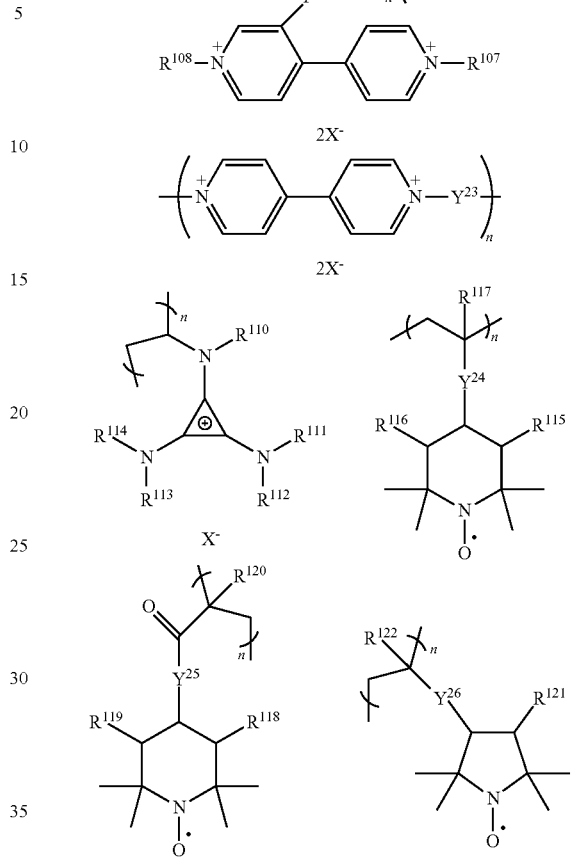

In the above formulae with regard to the polymer redox active species, each of $R^1$-$R^{103}$, $R^{109}$, $R^{115}$-$R^{122}$ is independently H, NO, F, Cl, Br, I, alkyl, alkoxy, haloalkyl, heteroalkyl, aryl, alkenyl, alkynyl, N(R), OP(R), OP(OR), C(O)R, C(O) OR, S(O) OR, or S(O) R; R is alkyl; R' is H, NO, F, Cl, Br, I, alkyl, alkoxy, haloalkyl, heteroalkyl, aryl, alkenyl, or alkynyl group; each of $R^{107}$, $R^{108}$, and $R^{110}$-$R^{114}$ is independently H, alkyl, haloalkyl, heteroalkyl, aryl, alkenyl, alkynyl, C(O)R, or C(O) OR; each of $D^1$-$D^4$ is independently O, S, S—O, S(=O), Se, NR', or PR'; each of $E^1$-$E^{38}$ is independently O, S, S—O, S(=O), Se, NR', or PR'; X is an anion selected from the group consisting of F, Cl—, Br, I, bis(trifluoromethanesulfonyl)imide, tetrafluoroborate, hexafluorophosphate, alkylsulfonylimide, fluoroalkylsulfonylimide, sulfonylimide, fluorosulfonylimide, fluoroalkylsulfonate, alkylsulfonate, bis(oxalate) borate, fluoro (oxalate) borate, fluoro (oxalate)phosphate, tris(oxalate) phosphate, and perchlorate; each of $Y^1$-$Y^{26}$ is independently an alkylene group with 1 to 3 atoms that may have a substituent, —CO—, —COO—, CONR—, —O—, —S—, —NR—, —SO—, —SOO—, —$SO_2O$—, —$SO_2NR$—, —SONR—, —PR—, or —POR—; and each of $Z^1$-$Z^4$ is independently S or O.

In any of the above embodiments, the redox active species (small molecule organic or polymer) is present in, or on, the cathode from about 0.1 wt % to about 15 wt %. For example, the redox active species may be present from about 0.1 wt % to about 10 wt %, from about 0.1 wt % to about 5 wt %, from about 1 wt % to about 15 wt %, from about 1 wt % to about 10 wt %, from about 1 wt % to about 5 wt %, or from about 1 wt % to about 3 wt %.

Electrolytes

As noted above, the electrolyte contains a salt and an aprotic solvent. Where the redox active species is a small organic molecule, it is desired that the aprotic solvent and/or solvent/salt combination are selected such that the small organic molecule has little to no solubility in the aprotic solvent. For example, the small organic molecule may be substantially insoluble in the aprotic solvent, and in such cases the salt concentration may be typical of most concentrations from 0.1 to about 3 or 4 M. However, other aprotic solvents such as more traditional carbonates may be used, but where the solubility of the small organic molecule is somewhat soluble in such a solvent when neat, the solubility may be greatly reduced by increasing the salt concentration to high levels. To illustrate, aprotic solvents where the small molecules are typically insoluble are fluorinated ether solvents (i.e., an ether having partial or perfluorination), while other more traditional solvents includes cyclic and acyclic carbonates.

Illustrative solvents include, but are not limited to, ethylene carbonate, dimethylcarbonate, diethylcarbonate, propylene carbonate, fluoroethylene carbonate (FEC), ethyl methyl carbonate, dioloxane, γ-butyrolactone, δ-butyrolactone, dimethyl ether, a silane, siloxane N-methyl acetamide, acetonitrile, an acetal, a ketal, esters, a carbonates, a sulfone, a sulfite, sulfolane, an aliphatic ether, a cyclic ether, a glyme, a polyether, a phosphate ester, a siloxane, a n-alkylpyrrolidone, fluoro ether and fluoro esters, fluoroethylene carbonate, or adiponitrile. In some embodiments, the solvent includes trifluoroethyl methyl carbonate (FEMC), dimethoxyethane (DME), dimethyl carbonate (DMC), 1,3-dioxolane (DOL), ethylmethyl carbonate (EMC), diethyl carbonate (DEC), dimethyl sulfoxide (DMSO), ethyl vinyl sulfone (EVS), tetramethylene sulfone (TMS), ethyl methyl sulfone (EMS), ethylene carbonate (EC), vinylene carbonate (VC), fluoroethylene carbonate (FEC), difluoroethylene carbonate (DFEC), 4-vinyl-1,3-dioxolan-2-one (VEC), dimethyl sulfone, ethyl methyl sulfone, methyl butyrate, ethyl propionate, trimethyl phosphate, triethyl phosphate, gamma-butyrolactone, 4-methylene-1,3-dioxolan-2-one, methylene ethylene carbonate (MEC), 4,5-dimethylene-1,3-dioxolan-2-one, allyl ether, triallyl amine, triallyl cyanurate, triallylisocyanurate, water, or a combination of any two or more thereof. Of course, a mixture of any two or more such solvents may also be used. In some embodiments, the solvent is a mixture of solvents such as, but not limited to, FEC-DEC, FEC-EC-DEC, FEC-EMC, FEC-EC-EMC, EC-DMC, EC-DEC, EC-PC, EC-PC-DMC, EC-PC-DEC, or EC-DEC-DMC.

Suitable lithium salts for the electrolyte may include, but are not limited to, $LiBF_2(C_2O_4)$; $LiB(C_2O_4)_2$; $LiPF_2(C_2O_4)_2$; $LiPF_4(C_2O_4)$; $LiPF_6$; lithium 4,5-dicyano-2-(trifluoromethyl)imidazole; lithium 4,5-dicyano-2-methylimidazole; trilithium 2,2',2"-tris(trifluoromethyl)benzotris(imidazolate); $LiN(CN)_2$; lithium 4,5-dicyano-2-(trifluoromethyl)imidazole; lithium 4,5-dicyano-2-methylimidazole; trilithium 2,2',2"-tris(trifluoromethyl) benzotris(imidazolate); $Li(CF_3CO_2)$; $Li(C_2F_5CO_2)$; $LiCF_3SO_3$; $LiCH_3SO_3$; $LiN(SO_2CF_3)_2$; $LiC(CF_3SO_2)_3$; $LiN(SO_2C_2F_5)_2$; $LiClO_4$; $LiBF_4$; $LiAsF_6$; $LiPF_6$; $LiPF_2(C_2O_4)_2$; $LiPF_4(C_2O_4)$; $LiB(C_2O_4)_2$; $LiBF_2(C_2O_4)_2$; $Li_2(B_{12}X_{12-i}H_i)$; $Li_2(B_{10}X_{10-i'}H_{i'})$; and a mixture of any two or more thereof, wherein X is independently at each occurrence a halogen, i is an integer from 0 to 12 and i' is an integer from 0 to 10.

In any or all of the above embodiments, the electrolyte may include the (lithium) salt at a concentration from about 0.1 M to about 10 M. This may include from about 0.1 M to about 8 M, from about 0.1 M to about 6 M, from about 0.1 M to about 5 M, from about 1 M to about 10 M, from about 1 M to about 8 M, from about 1 M to about 6 M, or from about 1 M to about 5 M. In embodiments where the electrolyte is a non-fluorinated solvent, the salt concentration may be larger, for example greater than 3 M. This includes from about 3 M to 10 M. In embodiments where the electrolyte includes a fluorinated solvent, the salt concentration may be from 0.1 M to 10 M, or any range as noted above. In embodiments where the electrolyte includes a mixture of a non-fluorinated carbonate and a fluorinated solvent, the salt concentration may be from 0.1 M to 10 M, or any range as noted above. In any or all of the above embodiments, the salt may include a lithium salt or a mixture of lithium salts, a sodium salt or a mixture of sodium salts, or a magnesium salt or a mixture of magnesium salts. In some embodiments, the salt comprises lithium bis(fluorosulfonyl)imide (LiFSI), lithium bis(trifluoromethylsulfonyl)imide (LiTFSI), sodium bis(fluorosulfonyl)imide (NaFSI), sodium bis(trifluoromethylsulfonyl)imide (NaTFSI), lithium bis(oxalato) borate (LiBOB), sodium bis(oxalato) borate (NaBOB), $LiPF_6$, $LiAsF_6$, $LiN(SO_2CF_3)_2$, $LiN(SO_2F)_2$, $LiCF_3SO_3$, $LiClO_4$, lithium difluoro oxalatoborate (LiDFOB), LiI, LiBr, LiCl, LiOH, $LiNO_3$, or any combination thereof. In certain of the foregoing embodiments, the salt is (i) LiFSI, LiTFSI, or a combination thereof, or (ii) NaFSI, NaTFSI, or a combination thereof; the solvent is DMC, DME, DOL, EMC, or a combination thereof; and the salt has a molar concentration in the electrolyte within a range of from 0.75 M to 1.5 M.

In some embodiments, the electrolyte may also contain an electrode stabilizing additive such as but is not limited to $LiB(C_2O_4)_2$, $LiBF_2(C_2O_4)_2$, vinylene carbonate, vinyl ethylene carbonate, propargylmethyl carbonate, 1,3,2-dioxathiolane-2,2-dioxide, ethylene sulfite, a spirocyclic hydrocarbon containing at least one oxygen atom and at least on alkenyl or alkynyl group, pyridazine, vinyl pyridazine, quinolone, pyridine, vinyl pyridine, 2,4-divinyl-tetrahydrooyran, 3,9-diethylidene-2,4,8-trioxaspiro[5,5]undecane, 2-ethylidene-5-vinyl-[1,3]dioxane, anisoles, 2,5-dimethyl-1,4-dimethoxybenzene, 2,3,5,6-tetramethyl-1,4-dimethoxybenzene, 2,5-di-tert-butyl-1,4-dimethoxybenzene, or a mixture of two or more thereof. However, where the electrode stabilizing additive contains lithium, and when used, it is not the same as the lithium salt.

In any or all of the above embodiments, the fluorinated ether may include one or more of 1,1,2,2-tetrafluoroethyl-2,2,2,3-tetrafluoropropyl ether (TTE), bis(2,2,2-trifluoroethyl) ether (BTFE), 1,1,2,2,-tetrafluoroethyl-2,2,2-trifluoroethyl ether (TFTFE), methoxynonafluorobutane (MOFB), and ethoxynonafluorobutane (EOFB). In any or all of the above embodiments, the solvent and the fluorinated ether may be miscible. In some embodiments, a LSE (low solubility electrolyte) includes an salt; a solvent comprising a carbonate solvent, an ether solvent, a phosphate solvent, dimethyl sulfoxide, water, or a combination thereof, wherein the salt is soluble in the solvent; a fluorinated ether, wherein the fluorinated ether is immiscible with the solvent and wherein salt has a solubility in the diluent at least 10 times less than a solubility of the salt in the solvent; and a bridge solvent having a different composition than the solvent and a different composition than the diluent, wherein the bridge solvent is miscible with the solvent and with the diluent. Exemplary bridge solvents include, but are not limited to, acetonitrile, dimethyl carbonate, diethyl carbonate, propylene carbonate, dimethyl sulfoxide, 1,3-dioxolane, dimethoxyethane, diglyme (bis(2-methoxyethyl) ether), triglyme (triethylene glycol dimethyl ether), tetraglyme (tetraethylene glycol dimethyl ether), or any combination thereof.

In some embodiments, the weakly solvating electrolyte may also contain other fluorinated solvents including but are not limited to fluorinated carbonates such as trifluoroethyl methyl carbonate (FEMC), bis(2,2,2-trifluoroethyl) carbonate (HFDEC), fluoroethylene carbonate (FEC), difluoroethylene carbonate (DFEC); or fluorinated sulfones such as ((trifluoromethyl)sulfonyl)ethane (FMES), 1-((trifluoromethyl)sulfonyl)propane (FMPS), 1,1,2,2-tetrafluoro-3-(methylsulfonyl)propane (TFPMS); or fluorinated monoethers such as 1,1,2,2-tetrafluoroethyl-2,2,2,3-tetrafluoropropyl ether (TTE), bis(2,2,2-trifluoroethyl) ether (BTFE), 1,1,2,2,-tetrafluoroethyl-2,2,2-trifluoroethyl ether (TFTFE); or fluorinated glycol ethers such as 1,1,1-trifluoro-2-(2-(2-(2,2,2-trifluoroethoxy)ethoxy)ethoxy)ethane (FDG), 1,1,1-trifluoro-2-(2-(2-methoxyethoxy)ethoxy)ethane (mFDG); or fluorinated carbamates such as 3-(trifluoromethyl)oxazolidin-2-one (TFMO), methyl bis(trifluoromethyl)carbamate (MTFC), 4-fluoro-3-methyloxazolidin-2-one (FMO); or fluorinated amides such as N,N-bi s(trifluoromethyl)acetamide (TFMA), 2,2,2-trifluoro-N,N-dimethylacetamide (TFDA); fluorinated esters such as methyl 2,2,2-trifluoroacetate (MTFA), 4-fluorodihydrofuran-2(3H)-one (HFHO), 2,2,2-trifluoroethyl acetate (TFEA); or fluorinated sulfonamides such as 1,1,1-trifluoro-N,N-dimethylmethanesulfonamide (TFDS), N,N-bis(trifluoromethyl)methanesulfonamide (TFMMS).

In some embodiments, the fluorinated ether solvent is 1,1,2,2-tetrafluoroethyl-2,2,2,3-tetrafluoropropyl ether (TTE), bis(2,2,2-trifluoroethyl) ether (BTFE), 1,1,2,2,-tetrafluoroethyl-2,2,2-trifluoroethyl ether (TFTFE), methoxynonafluorobutane (MOFB), or ethoxynonafluorobutane (EOFB). In some embodiments, the carbonate solvent is propylene carbonate (PC), fluoroethylene carbonate (FEC), trifluoroethyl methyl carbonate (FEMC), dimethyl carbonate (DMC), ethylmethyl carbonate (EMC), diethyl carbonate (DEC), ethylene carbonate (EC), vinylene carbonate (VC), difluoroethylene carbonate (DFEC), or a combination of any two or more thereof.

In embodiments herein, where the electrolyte includes a mixture of a fluorinated ether solvent and a carbonate solvent they may be present in a volume ratio of 10:90 to 90:10.

In some embodiments, the electrolyte may also include a redox shuttle material. The shuttle, if present, will have an electrochemical potential above the positive electrode's maximum normal operating potential. Illustrative stabilizing agents include, but are not limited to, a spirocyclic hydrocarbon containing at least one oxygen atom and at least on alkenyl or alkynyl group, pyridazine, vinyl pyridazine, quinolone, pyridine, vinyl pyridine, 2,4-divinyl-tetrahydrooyran, 3,9-diethylidene-2,4,8-trioxaspiro[5,5]undecane, 2-ethylidene-5-vinyl-[1,3]dioxane, lithium alkyl fluorophosphates, lithium alkyl fluoroborates, lithium 4,5-dicyano-2-(trifluoromethyl)imidazole, lithium 4,5-dicyano-2-methylimidazole, trilithium 2,2',2''-tris(trifluoromethyl) benzotris(imidazolate), $Li(CF_3CO_2)$, $Li(C_2F_5CO_2)$, $LiCF_3SO_3$, $LiCH_3SO_3$, $LiN(SO_2CF_3)_2$, $LiC(CF_3SO_2)_3$, $LiN(SO_2C_2F_5)_2$, $LiClO_4$, $LiAsF_6$, $Li_2(Bi_2X_{12-I}H_I)$, $Li_2(B_{10}X_{10-I'}H_{I'})$, wherein X is independently at each occurrence a halogen, I is an integer from 0 to 12 and I' is an integer from 0 to 10, 1,3,2-dioxathiolane 2,2-dioxide, 4-methyl-1,3,2-dioxathiolane 2,2-dioxide, 4-(trifluoromethyl)-1,3,2-dioxathiolane 2,2-dioxide, 4-fluoro-1,3,2-dioxathiolane 2,2-dioxide, 4,5-difluoro-1,3,2-dioxathiolane 2,2-dioxide, dimethyl sulfate, methyl (2,2,2-trifluoroethyl) sulfate, methyl(trifluoromethyl) sulfate, bis(trifluoromethyl) sulfate, 1,2-oxathiolane 2,2-dioxide, methyl ethanesulfonate, 5-fluoro-1,2-oxathiolane 2,2-dioxide, 5-(trifluoromethyl)-1,2-oxathiolane 2,2-dioxide, 4-fluoro-1,2-oxathiolane 2,2-dioxide, 4-(trifluoromethyl)-1,2-oxathiolane 2,2-dioxide, 3-fluoro-1,2-oxathiolane 2,2-dioxide, 3-(trifluoromethyl)-1,2-oxathiolane 2,2-dioxide, difluoro-1,2-oxathiolane 2,2-dioxide, 5H-1,2-oxathiole 2,2-dioxide, 2,5-dimethyl-1,4-dimethoxybenzene, 2,3,5,6-tetramethyl-1,4-dimethoxybenzene, 2,5-di-tert-butyl-1,4-dimethoxybenzene or a mixture of any two or more thereof, with the proviso that when used, the redox shuttle is not the same as the lithium salt, even though they perform the same function in the cell. That is, for example, if the lithium salt is $LiClO_4$, it may also perform the dual function of being a redox shuttle, however if a redox shuttle is included in that same cell, it will be a different material than $LiClO_4$.

Anodes

Illustrative anodes for the electrochemical cells include, but are not limited to, carbon nanotubes, carbon fiber, microporous carbon, mesoporous carbon, macroporous carbon, mesoporous microbeads, graphite, expandable graphite, polymer yield carbon, or carbon black, $Li^0$, $Sb^0$, $Si^0$, Si—C, SiO, $Sn^0$, tin oxide, $Li_4Ti_5O_{12}$, a composite tin alloy, a transition metal oxide, a lithium metal nitride, phosphorous, a phosphorous-carbon composite, or a mixture of any two or more thereof. In some embodiments, the anode includes lithium metal (i.e., $Li^0$).

The anode may also include a current collector, a conductive carbon material, a binder, or any combination thereof. The anode current collector may be prepared from a wide variety of materials. For example, illustrative current collectors include, but are not limited to, carbon, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen. In some embodiments, the electroactive material disclosed herein and one or more of a conductive carbon material and a binder are contacted with the current collector by casting, pressing, or rolling the mixture thereto. In some embodiments, the current collector is copper, stainless steel, titanium, tantalum, platinum, gold, aluminum, nickel, cobalt, cobalt nickel alloy, highly alloyed ferritic stainless steel containing molybdenum and chromium, a nickel-containing alloy, a chromium-containing alloy, or a molybdenum-containing alloy.

The current collectors may be in electrical contact with one another through an external circuit. The secondary battery may exhibit a jelly roll or stacked construction.

Cathodes

For lithium secondary batteries, or cathodes to be used in lithium secondary batteries, the cathodic material may include either lithiated materials or surface coated lithiated materials. For example, such materials and composites include, but are not limited to, $MnO_2$, $V_2O_5$, $LiVO_3$, air (oxygen), $FeF_2$, a spinel, an olivine, a carbon-coated olivine, $LiFePO_4$, $LiCoO_2$, $LiNiO_2$, $LiNi_{1-x}Co_yM^4_zO_2$, $LiMn_{0.5}Ni_{0.5}O_2$, $Li_{1+x}Mn_{2-z}M^4_yO_{4-m}X^1_n$, $LiFe_{1-z}M^6_yPO_{4-m}X^1_n$, $LiMn_{1/3}Co_{1/3}Ni_{1/3}O_2$, $LiMn_2O_4$, $LiFeO_2$, $LiM^4_{0.5}Mn_{1.5}O_4$, $Li_{1+x''}Ni_\alpha Mn_\beta Co_\gamma M^5_\delta O_{2-z''}$ both single composition or gradient composition, $Li_2MnO_3$-$Li_aM_bM'_cM''_dO_e$, $Li_nB^1{}_2(M^2O_4)_3$ (Nasicon), $Li_2MSiO_4$, or a mixture of any two or more thereof, wherein $M^2$ is P, S, Si, W, or Mo; $M^4$ is Al, Mg, Ti, B, Ga, Si, Ni, or Co; $M^5$ is Mg, Zn, Al, Ga, B, Zr, or Ti; A is Li, Ag, Cu, Na, Mn, Fe, Co, Ni, or Zn; $M^6$ is Al, Mg, Ti, B, Ga, Si, Ni, Mn or Co; M, M', and M" are transition metals; $B^1$ is Ti, V, Cr, Fe, or Zr; $X^1$ is S or F; $0 \le x \le 0.3$; $0 \le y \le 0.5$; $0 \le z \le 0.5$; $0 \le m \le 0.5$; $0 \le n \le 0.5$; $0 \le x'' \le 0.4$; $0 \le a \le 2$; $0 \le b \le 1$; $0 \le c \le 1$; $0 \le d \le 1$; $0 \le \alpha \le 1$; $0 \le \beta \le 1$; $0 \le \gamma \le 1$; $0 \le \delta \le 0.4$; $0 \le z'' \le 0.4$; $0 \le n' \le 3$; $0 \le a+b+c+d \le 6$; $0 \le e \le 4$; and $0 \le \alpha+\beta+\gamma+\delta$.

For sodium secondary batteries, or cathodes to be used in sodiated secondary batteries, the cathodic material may include either sodiated materials or surface coated sodiated materials. For example, such materials and composites include, but are not limited to a spinel, an olivine, a carbon-coated olivine, $NaFePO_4$, $NaCoO_2$, $NaNiO_2$, $NaNi_{1-x}Co_yM^4{}_zO_2$, $NaMn_{0.5}Ni_{0.5}O_2$, $NaMn_{1/3}Co_{1/3}Ni_{1/3}O_2$, $NaMn_2O_4$, $NaFeO_2$, $NaM^4{}_{0.5}Mn_{1.5}O_4$, $Na_{1+x''}Ni_\alpha Mn_\beta Co_\gamma M^5{}_\delta O_{2-z''}F_{z''}$, $Na_2MnO_3$—$Na_aM_bM'_cM''_dO_e$, $Na_nB^1{}_2(M^2O_4)_3$ (Nasicon), $Na_2MSiO_4$, $NaVPO_4F$ or a mixture of any two or more thereof, wherein $M^2$ is P, S, Si, W, or Mo; $M^4$ is Al, Mg, Ti, B, Ga, Si, Mn, or Co; $M^5$ is Mg, Zn, Al, Ga, B, Zr, or Ti; M, M', and M" are transition metals; $B^1$ is Ti, V, Cr, Fe, or Zr; $0 \le x \le 0.3$; $0 \le y \le 0.5$; $0 \le z \le 0.5$; $0 \le m \le 0.5$; $0 \le n \le 0.5$; $0 \le x'' \le 0.4$; $0 \le a \le 2$; $0 \le b \le 1$; $0 \le c \le 1$; $0 \le d \le 1$; $0 \le \delta \le 1$; $0\beta \le 1$; $0 \le \gamma \le 1$; $0 \le \delta \le 1$; $0 \le \delta' \le 0.4$; $0 \le z'' \le 0.4$; $0 \le n' \le 3$; $0 \le a+b+c+d$, and $0 < e$.

The cathodic material may include, in some embodiments, a spinel, an olivine, or a carbon-coated olivine. For example, the cathodic material may be, according to an embodiment, a spinel manganese oxide of formula of $Li_{1+x}Mn_{2-z}M^4{}_yO_{4-m}X^1{}_n$, wherein $M^4$ is Al, Mg, Ti, B, Ga, Si, Ni, or Co; $X^1$ is S or F; $0 \le x \le 0.3$; $0 \le y \le 0.5$; $0 \le z \le 0.5$; $0 \le m \le 0.5$; and $0 \le n \le 0.5$. The cathodic material may be, according to an embodiment, an olivine of formula of $LiFe_{1-z}M^6{}_yPO_{4-m}X^1{}_n$ or a mixture of any two or more such olivines; wherein $M^6$ is Al, Mg, Ti, B, Ga, Si, Ni, Mn or Co; $X^1$ is S or F; $0 \le x \le 0.3$; $0 \le y \le 0.5$; $0 \le z \le 0.5$; $0 \le m \le 0.5$; and $0 \le n \le 0.5$.

The cathodic material may include a blend of a spinel and $Li_{1+x''}Ni_\alpha Mn_\beta Co_\gamma M^5{}_\delta O_{2-z''}F_z$, wherein $M^5$ is Mg, Zn, Al, Ga, B, Zr, or Ti; $0 \le x'' \le 0.4$; $0 \le \alpha \le 1$; $0 \le \beta \le 1$; $0 \le \gamma \le 1$; $0 \le \delta \le 0.4$; $0 \le z'' \le 0.4$; $0 \le \alpha+\beta+\gamma+\delta$. The ratio of the spinel to the $Li_{1+x''}Ni_\alpha Mn_\beta Co_\gamma M^5{}_\delta O_{2-z''}F_{z''}$ may be from about 0.5 wt % to about 98 wt %. Alternatively, the cathode may include a blend of an olivine or a carbon-coated olivine, and $Li_{1+x''}Ni_\alpha Mn_\beta Co_\gamma M^5{}_\delta O_{2-z''}F_z$ wherein $M^5$ is Mg, Zn, Al, Ga, B, Zr, or Ti; $0 \le x'' \le 0.4$; $0 \le \alpha \le 1$; $0 \le \beta \le 1$; $0 \le \gamma \le 1$; $0 \le \delta \le 0.4$; $0 \le z'' \le 0.4$; $0 < \alpha+\beta+\gamma+\delta$. The ratio of the ratio of the olivine or carbon-coated olivine to the $Li_{1+x''}Ni_\alpha Mn_\beta Co_\gamma M^5{}_\delta O_{2-z''}F_z$ may be from about 0.5 wt % to about 98 wt %.

The cathodic material may include a non-lithiated or non-sodiated material such as $MnO_2$, $V_2O_5$, $LiVO_3$, $MoS_2$, $FeS_2$, S, organic cathode, air or oxygen cathode such as carbon, $FeF_3$, $FeF_2$, or a mixture of any two or more thereof. In other embodiments, the cathodic material includes sulfur. In some embodiments, the cathodic material is air (oxygen).

Where the cathode is for use in a sodium ion electrochemical cell, the cathodic material may include $NaM_{1-x}M'_xPO_4$, $Na_xM_yM'_zO_2$, $Na_2FePO_4F$, $Na_2MnPO_4F$, $NaFeSO_4F$, $NaMnSO_4F$, $NaV_{1-\alpha}Cr_\alpha PO_4F$, $Na_2S$, $Na_2Se$, or a mixture of any two or more thereof, wherein $0 < x$; $0 < y+z$; M is Mn, Ni, Fe, Co, or Cu; M' is Cr or Mg; and $0 \le \alpha \le 1$.

The cathode may be further stabilized by surface coating the active particles with a material that can neutralize acid or otherwise lessen or prevent leaching of the transition metal ions. Hence the cathodes can also comprise a surface coating of a metal oxide or fluoride such as $ZrO_2$, $TiO_2$, $ZnO_2$, $WO_3$, $Al_2O_3$, MgO, $SiO_2$, $SnO_2$, $AlPO_4$, $Al(OH)_3$, $AlF_3$, $ZnF_2$, $MgF_2$, $TiF_4$, $ZrF_4$, $LiMPO_4$ or $LiMBO_3$, where in M indicates transition metal such as but not limited to Ni, Mn, Co, or a mixture of any two or more thereof, or of any other suitable metal oxide or fluoride. The coating can be applied to a carbon-coated cathode. The cathode may be further stabilized by surface coating the active particles with polymer materials. Examples of polymer coating materials include, but are not limited to, polysiloxanes, polyethylene glycol, or poly(3,4-ethylenedioxythiophene) polystyrene sulfonate, a mixture of any two or more polymers. The cathode may be carbon-coated to improve the stability and conductivity via chemical or physical method. Examples of carbon coating includes but not limit to high-energy mixing, vapor phase deposition, plasma-assisted chemical vapor deposition (CVD), spraying, liquid-phase deposition, electrochemical deposition, plasma enhanced atomic layer deposition, calcination of carbon precursor, or other mechanical or chemical means.

The cathodes, or the cathode(s) of the secondary battery, also include a primary cathodic material. In some embodiments, the cathode includes a mixture of the electrochemical active material and the primary cathodic material. The primary cathodic material may include a lithiated positive active material, a non-lithiated positive active material, a sodiated positive active material, a non-sodiated positive active material, or a mixture of any two or more thereof. In some embodiments, the primary cathodic material may include a lithiated positive active material, a sodiated positive active material, or a mixture of lithiated and sodiated positive active material.

The primary cathodic material may include a positive active material that is configured to only insert, or de-insert lithium or sodium. For example, the positive active material may be configured to only insert, or de-insert lithium from about 1.5 V to about 5.0 V vs. lithium. Alternatively, the positive active material may be configured to only insert, or de-insert sodium from 1.2 to 5.0 V vs. sodium. As used herein, "insert" or "de-insert" is used to refer to the movement of either the lithium or sodium ion(s) into, or out of, respectively, the cathode material either through absorption, adsorption, intercalation, conversion, or alloying.

The cathode may include a current collector, a porous carbon (e.g. conductive) material, and/or a polymeric binder. The current collector may include copper, stainless steel, titanium, tantalum, platinum, gold, aluminum, nickel, cobalt-nickel alloys, highly alloyed ferritic stainless steel containing molybdenum and chromium; or nickel-, chromium-, or molybdenum-containing alloys. The current collector may be a foil, mesh, or screen, and the porous carbon material and optional metal oxide are contacted with the current collector by casting, pressing, or rolling the mixture thereto. The porous carbon material may include microporous carbon, mesoporous carbon, mesoporous microbeads, graphite, expandable graphite, carbon black, or carbon nanotubes. Commercial examples of carbon black include, but are not limited to, Super P, Black Pearl 2000, Denka Black, Vulcan XC72R, Ketjen black.

Cathode and Anode Binders

When used, binders may be present in the anode and/or cathode in an amount of from about 0.1 wt % to about 99 wt %. In some embodiments, the binder is present in the electrode in an amount of from about 5 wt % to about 20 wt %. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, sodium alginate, polythiophene, polyacetylene, poly(9,9-dioctylfluorene-co-fluorenone), poly(9,9-dioctylfluorene-co-fluorenone-co-methylbenzoic ester), a copolymer of any two or more such polymers, and a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), and a copolymer of any two or more such conductive polymers.

Separators

In addition to a cathode and anode, the batteries may include a separator. Illustrative separators include, but are not limited to, polyethylene, polypropylene, or polyvinylidene fluoride, or solid state separators as well.

Methods

Also provided in another aspect are methods of making the electrochemical cells described herein, particularly with regard to the incorporation of the redox active species in or on the cathode and cathode active material. As noted above, the redox active species may be mixed in the bulk of the cathode active material. Accordingly, mixing of the cathode active material with any binder, conductive carbon species, or other additives may be done in the presence of the redox active species in a solvent. This may then be applied to the cathode current collector as a slurry that this then dried, thereby incorporating the redox active species in to the bulk of the cathode active material.

Alternatively, or in addition to the redox active species in the bulk of the cathode active material, the redox active species may be coated onto the surface of the cathode and cathode active material. This may lead to the redox active species being on a surface of the cathode laminate that is formed, leading to a significant activation of $Li_2HQ$. By coating the cathode after formation, can avoid compatibility or handling issues that may be encountered with the redox active species in the slurry.

The above methods may be used to incorporate the small molecule organic redox species or the polymeric species, however, as described above, there are other options with regard to the polymeric redox species. For example, it may be mixed into a slurry mixture containing active cathode materials, conductive carbon and polymer binder, and the resulting slurry is then cast onto the current collector to fabricate the positive electrode. The redox active polymer may also be dissolved in a solvent and the resulting solution was cast on a fabricated positive electrode to form a redox active coating layer. Conductive carbon or carbon nanotubes may be added to the polymer solution for application with the polymer. And, as noted above, the redox active polymer may function as a binder for the cathode, alone, or in conjunction with other binders.

In the methods, after formation of the cathode, the redox active species is suspended in a compatible solvent, applied to the surface of the cathode and the solvent removed. Illustrative solvents include toluene and hexane, as well as any of the other solvents mentioned herein.

Where the battery is a sodium ion battery, the cathode may include a porous carbon material, and the electrochemical pre-lithiation active material. The amount of pre-lithiation material in the cathode may be from about 0.2 wt % to about 15 wt %, or from about 0.2 wt % to about 10 wt %.

Methods of operating a secondary battery (electrochemical cells) are also provided. In such methods, an as-prepared secondary battery is provided, the secondary battery having a cathode with redox active species mixed into or coated on cathode, an anode, a separator, and electrolyte. After the lithiated redox active organic molecule oxidizes on the positive electrode, lithium (reference to lithium may also include sodium as alternative embodiments) cations diffuse into the electrolyte while the dissolution of the oxidized organic molecule is limited by the low solubility of the weakly solvating electrolyte, or due to the polymeric structure of the redox species, and thus, the oxidized molecule will stay sequestered on the cathode. During this process, lithium cations on the anode will be reduced and the recyclable lithium reservoir will be replenished. In addition to the multitude of redox active species described above, illustrative examples of lithiated redox active organic molecules include, but are not limited to, lithiated hydroquinone and its derivatives, lithiated catechol and its derivatives, lithiated naphthalenediol and its derivatives, lithiated anthracenediol and its derivatives. For lithium batteries, charging occur, in some embodiments, from about 1 volts to about 5 volts. Thus, for lithium batteries the voltage range may, in some embodiments, be from about 1 volts to about 5 volts.

In another aspect, a method of operating a secondary battery is provided. In the method, an as-prepared secondary battery is provided, the secondary battery having a cathode with redox active species mixed into or coated on cathode, an anode, a separator, and electrolyte. In some embodiments, the redox active species comprises non-lithiated redox active species comprising a redox active organic molecule. After the non-lithiated redox organic molecule oxidizes on the positive electrode, the dissolution of the oxidized organic molecule is limited by the low solubility of the weakly solvating electrolyte employed and the oxidized molecule will stay inert on the cathode. Meanwhile, lithium cations from the electrolyte will be reduced on the anode and the recyclable lithium reservoir will be replenished. The examples of non-lithiated redox active organic molecules include, but are not limited to, (2,2,6,6-tetramethylpiperidin-1-yl)oxyl or (2,2,6,6-tetramethylpiperidin-1-yl)oxidanyl and its derivatives, 2,2,5,5-tetramethylpyrrolidine-N-oxyl nitroxide and its derivatives, 1,4-dialkoxybenzene and its derivatives, quinoxaline and its derivatives, dipyridylketone and its derivatives, catechol phenylborate ester, viologen and its derivatives and amino-substituted cyclopropenium salts.

When the freshly assembled battery is in a discharged state, the electrochemically active materials, i.e., lithium or sodium, are present in the coating layer in the as-prepared battery. The method includes charging the as-prepared secondary battery by transmitting lithium (or sodium) ions from positive electrode to the negative electrode through the electrolyte. The secondary battery may then be discharged by transmitting lithium or sodium ions from the anode to cathode through the electrolyte, and then charging again by transmitting lithium or sodium ions from cathode to anode through the electrolyte.

The batteries and electrochemical cells described herein may be used for various types of applications. For example, the secondary batteries may be used in portable electronics such as cell phones, laptop computers, and cameras, and in large power applications such in electric vehicles, hybrid electric vehicles, plug-in hybrid electric vehicles, and smart grids.

The present invention, thus generally described, will be understood more readily by reference to the following examples, which are provided by way of illustration and are not intended to be limiting of the present invention.

EXAMPLES

Example 1. Small Redox Organic Molecules are Used for the Pre-Lithiation of lithium batteries. Dilithiated hydroquinone ($Li_2HQ$), can be obtained by reacting hydroquinone (HQ) with lithium hydroxide. The $Li_2HQ$ can be used for pre-lithiation of cathode active material lithium layered oxide $LiNi_{0.775}Mn_{0.2}Co_{0.05}O_2$ (NMC). The activation of the $Li_2HQ$ containing cathode using conventional electrolytes leads to severe side reactions, rendering very low specific capacity for the cathode. However, if low solubility electrolytes are employed, the activation of $Li_2HQ$ containing cathode, shuttling side reactions are suppressed, leading to successful pre-lithiation. A full cell of Si||$Li_2HQ$-NMC with a low solubility electrolyte delivers significantly higher capacity than the cell without any pre-lithiating reagent. This supports the effectiveness of this novel pre-lithiation method.

Upon oxidation, dilithiated hydroquinones will be oxidized to benzoquinones (BQ) with the release of lithium cations:

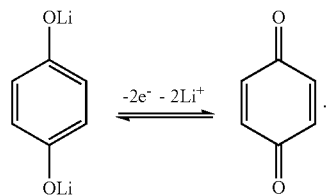

Figure 3A:
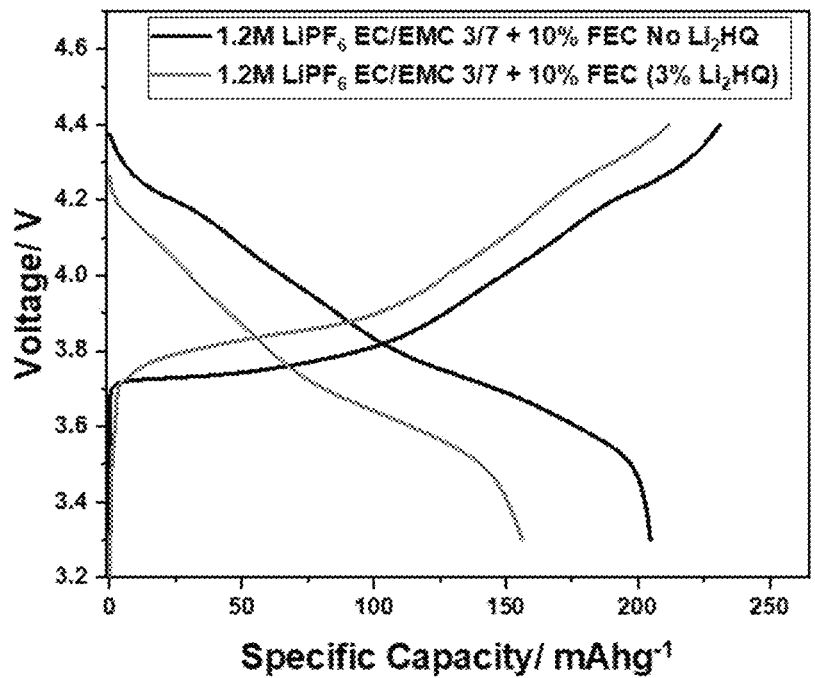
FIG. 3 includes graphs of the first cycle voltage profiles of Li∥NMC and Li∥Li$_2$HQ-NMC cells using (A) conventional and (B) weakly solvating concentrated (LiFSI:EMC 1:1.2, molar ratio) electrolytes; and (C) the 3$^{rd}$ cycle voltage profiles in weakly solvating concentrated (LiFSI:EMC 1:1.2, molar ratio) electrolytes, according to the examples.
Figure 3B:
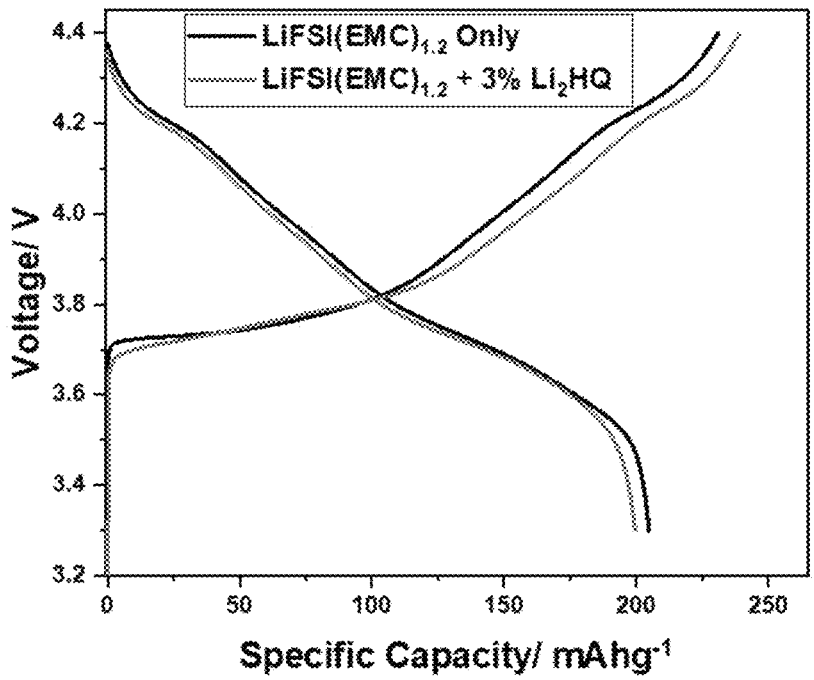
Figure 3C:
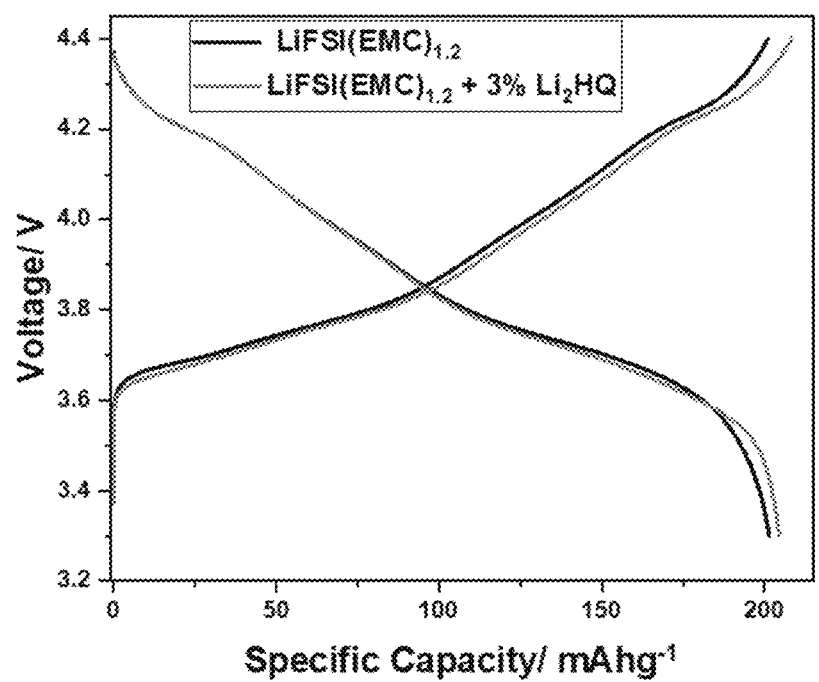

The prelithiating reagent was preloaded on the cathode by spraying the solution/mixture of $Li_2HQ$ on the NMC cathode surface and vacuum drying out all the solvents.

Where a $Li_2HQ$ preloaded cathode ($Li_2HQ$-NMC) was activated using conventional electrolyte (1.2M $LiPF_6$ EC/EMC 3/7 with 10% FEC), a very severe shuttling effect was observed. As shown in FIGS. 3A and 3B, the specific capacity of the preloaded cathode is significantly lowered than that of normal cathode without $Li_2HQ$, which is induced by severe side reactions between the dissolved $Li_2HQ$/BQ with the electrodes. This shuttling effect is evidenced by the exceptionally low $1^{st}$ cycle Coulombic efficiency (CE) for the preloaded cell.

Figure 4A:
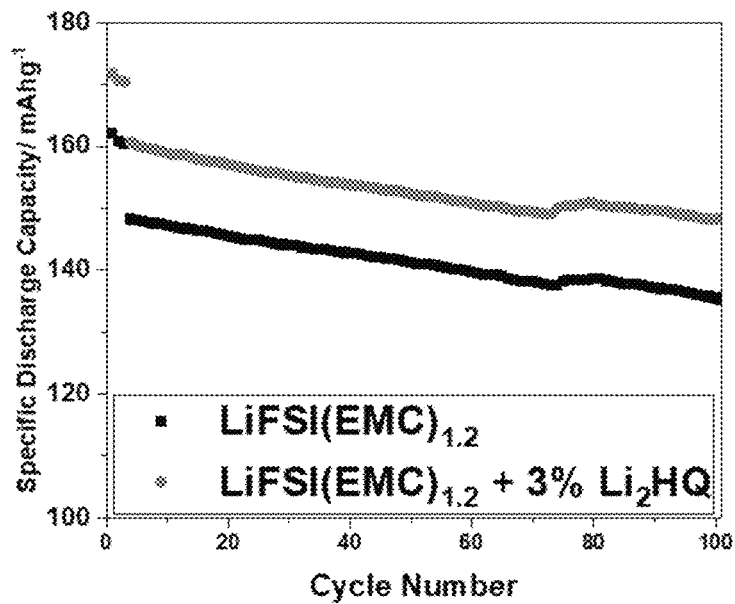
FIGS. 4A-4B include graphs of the (A) cycling performance and (B) Coulombic efficiency of baseline (Si∥NMC) and Si∥Li$_2$HQ-NMC cells weakly solvating concentrated electrolyte (LiFSI:EMC 1:1.2, molar ratio), according to the examples.
Figure 4B:
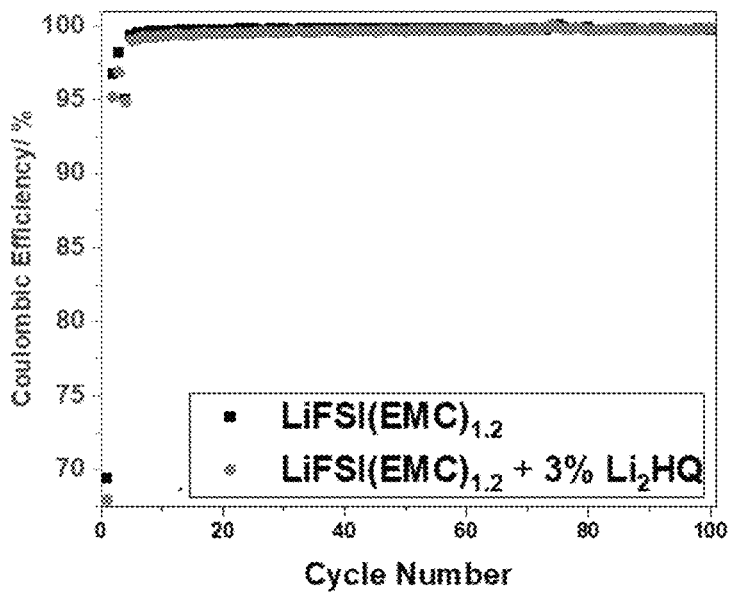
Figure 5A:
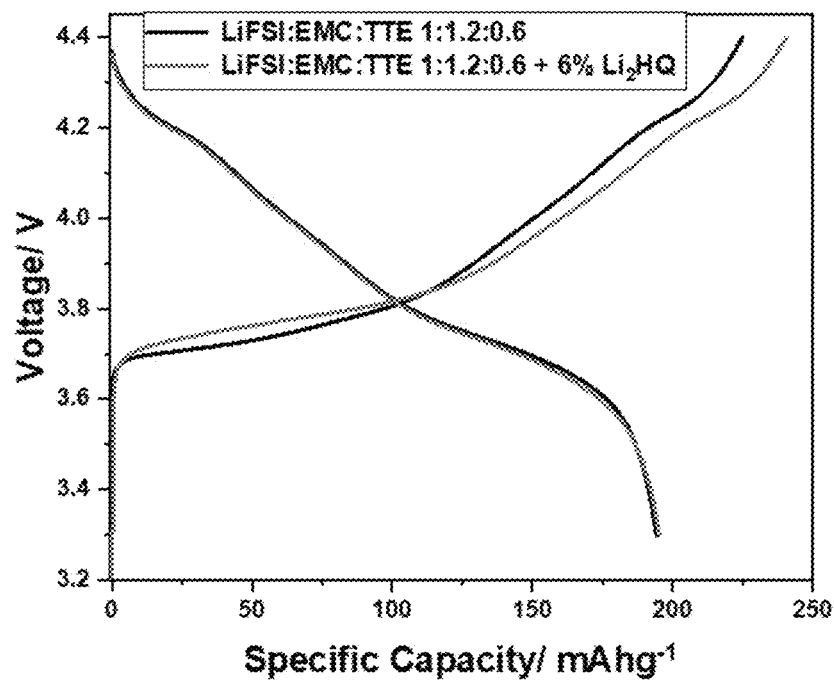
FIGS. 5A-5B include graphs of the (A) the first cycle voltage profiles and (B) Coulombic efficiency of Li∥NMC and Li∥Li$_2$HQ-NMC cells using weakly solvating fluorinated electrolyte (LiFSI:EMC:TTE 1:1.2:0.6, molar ratio), according to the examples.
Figure 5B:
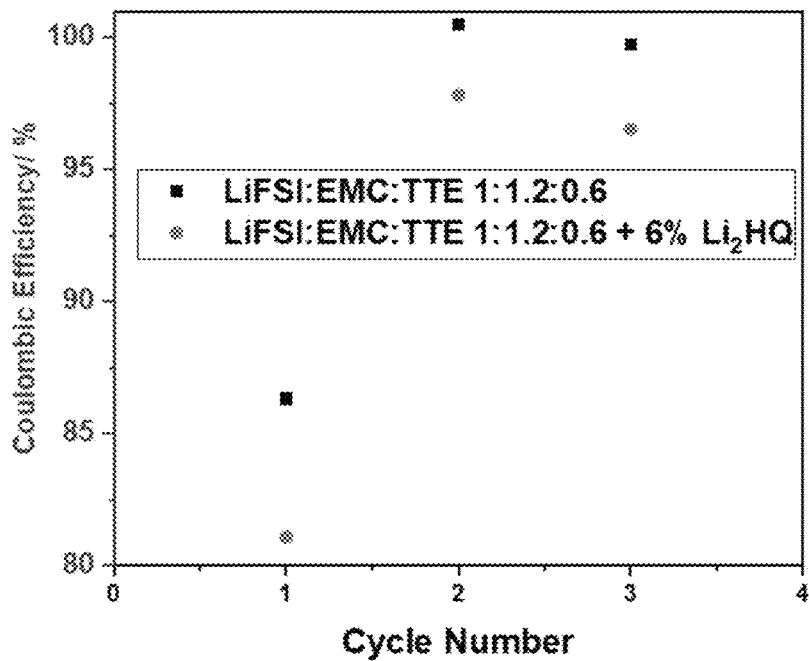

Example 2. In contrast to the convention electrolytes used in Example 1, a Li||$Li_2HQ$-NMC cell employing a weakly solvating electrolyte (LiFSI:EMC 1:1.2, molar ratio; i.e. this is a very high concentration salt in the solvent) with low solubility of redox molecules, is capable of suppressing the shuttling of $Li_2HQ$/BQ couple, as evidenced by the enhanced $1^{st}$ cycle CE (Coulomic Efficiency) compared to the cell using conventional electrolyte (see FIGS. 4A and 4B). When CE was used to estimate the activation rate, the $1^{st}$ cycle activation rate was 30%. However, the 3 formation cycles were addressed, the activation rate was nearly 100%, demonstrating that very high activation of $Li_2HQ$ can be achieved. Unlike the half cells employing the conventional electrolytes, the specific capacity of the activated half cell is almost the same as the half cell without any pre-lithiating reagent when low solubility electrolyte was used, suggesting negligible side reactions occurred. The suppression of shuttling effect can be clearly observed from the $1^{st}$ cycle voltage profiles of Li||NMC and Li||$Li_2HQ$-NMC cells using different electrolytes, as depicted in FIGS. 5A and 5B. Severe shuttling effects were observed for the Li||$Li_2HQ$-NMC cell using conventional electrolytes, signaling by the exceptionally low CE and very low specific discharge capacity. On the contrary, the Li||$Li_2HQ$-NMC cell employing weakly solvating low solubility electrolyte did not show any shuttling effect and the specific discharge capacity of the activated cell was very similar to the baseline cell.

The benefit of using this new pre-lithiation method can be concisely demonstrated by the cycling performance of Si||$Li_2HQ$-NMC full cells using weakly solvating low solubility electrolyte, as displayed in FIGS. 6A and 6B. The activated full cell shows an approximate 6% increase in specific discharge capacity compared to the full cell without any pre-lithiating reagent ($Li_2HQ$) with very similar capacity fading and cycling pattern.

Figure 7A:
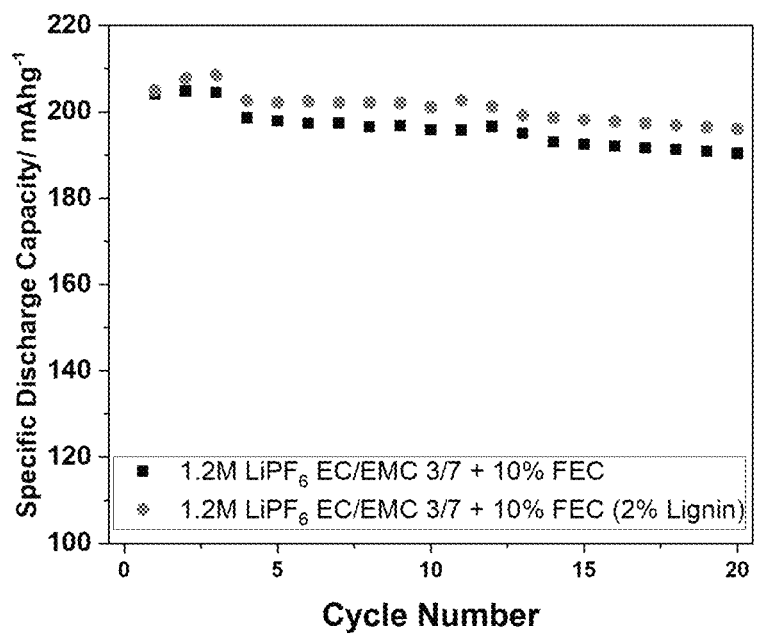
FIGS. 7A-7B are a composite graph of (A) Cycling performance and (B) Coulombic efficiency of baseline (Li∥NMC) and Li∥Lignin-NMC cells using Gen2 with 10% FEC electrolyte, according to the examples.
Figure 7B:
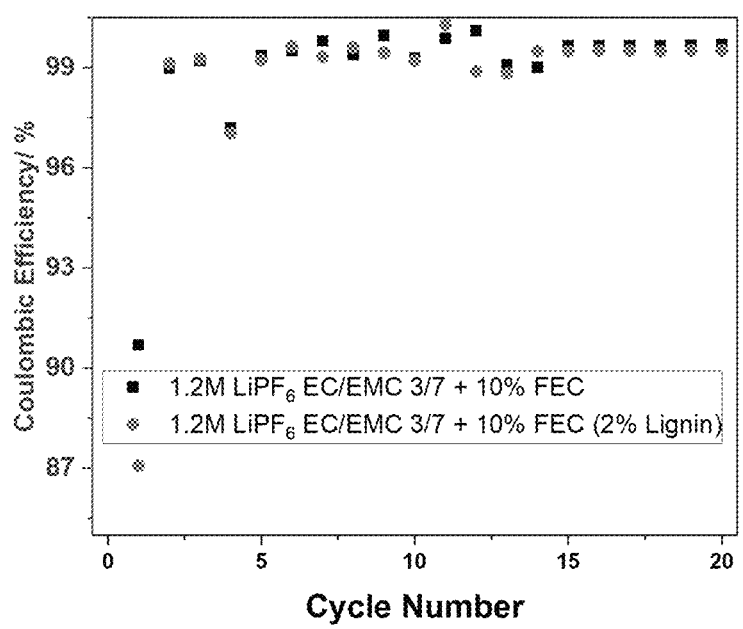

Example 3. The weakly solvating fluorinated electrolyte (LiFSI:EMC:TTE) can also suppress the shuttling of $Li_2HQ$ and enable the pre-lithitaion due to its low solubility towards the redox molecules. As demonstrated in FIGS. 7A and 7B, $Li_2HQ$ is successfully activated in the LiFSI:EMC:TTE (1:1.2:0.6 molar ratio) and after three cycles the activation rate reaches 99% based on the Coulombic efficiency.

Example 4. Redox Polymer Example. Redox polymer can provide additional capacity and be used as pre-lithiation reagent on cathode provided that its reduction potential is below the lower cutoff voltage of the cell. In this study, redox polymers were used as co-binders, which oxidized during the charging process, to provide extra capacity to the relative expensive layered oxide cathode. Lithium layered oxide $LiNi_{0.775}Mn_{0.2}Co_{0.05}O_2$ (NMC) is chosen as the cathode material.

Pictorially, the lignin and the reaction mechanism of the functional group(s) on the lignin may be as follows for these specific illustrative examples:

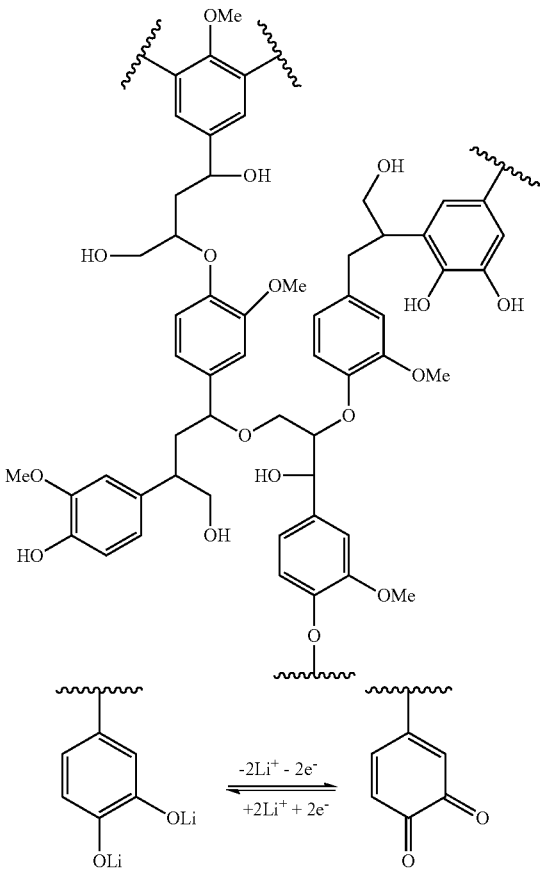

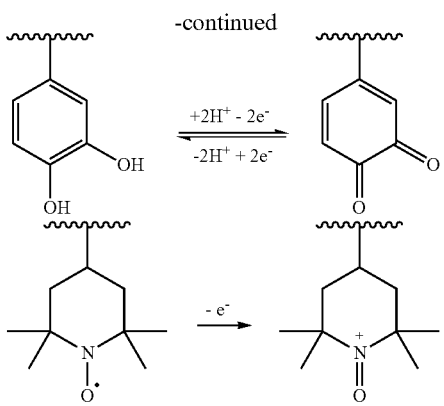

Figure 6:
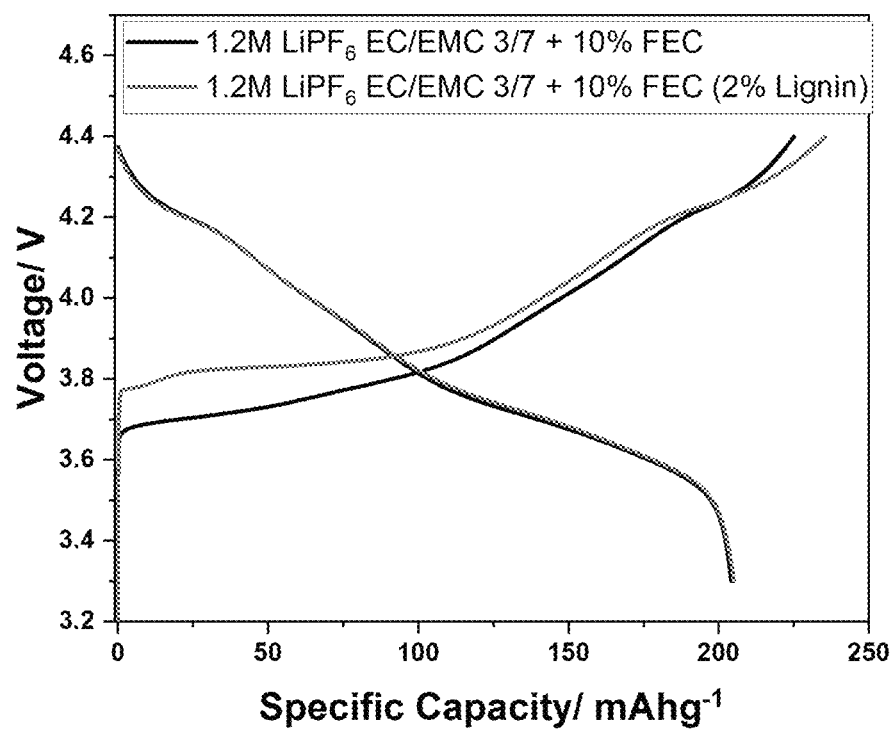
FIG. 6 is a composite graph of the first cycle voltage profiles of Li∥NMC (baseline) and Li∥Lignin-NMC cells using Gen2 with 10% FEC electrolyte, according to the examples.

Successful pre-lithiation was achieved by using another polymer, lignin, as a co-binder. As depicted in FIG. 6, the 1st cycle voltage profiles of Li∥NMC and Li∥Lignin-NMC cells using Gen2 (3:7 EC:EMC) with 10% FEC electrolyte evidently showed the activation of lignin at around 4.2V. The discharge curve of Li∥Lignin-NMC cell almost overlap with the curve of Li∥NMC baseline cell, suggesting negligible side reaction was introduced upon the activation of lignin. The subsequent cycling of cell is also very similar to the baseline cell as displayed in FIG. 7, indicating stable cycling of Li∥Lignin-NMC cell after activation.

Figure 8A:
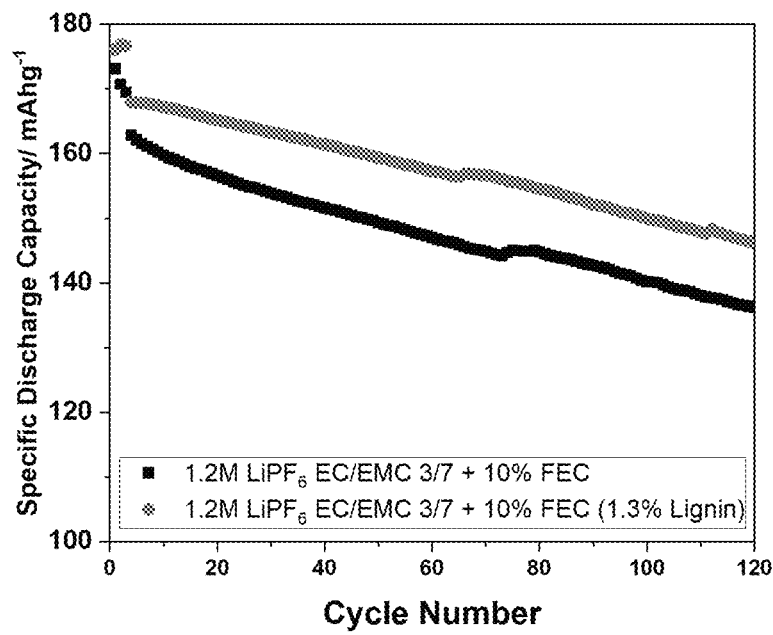
FIGS. 8A-8B are a composite graph of (A) Cycling performance and (B) Coulombic efficiency of baseline (Si∥NMC) and Si∥Lignin-NMC cells using Gen2 with 10% FEC electrolyte, according to the examples.
Figure 8B:
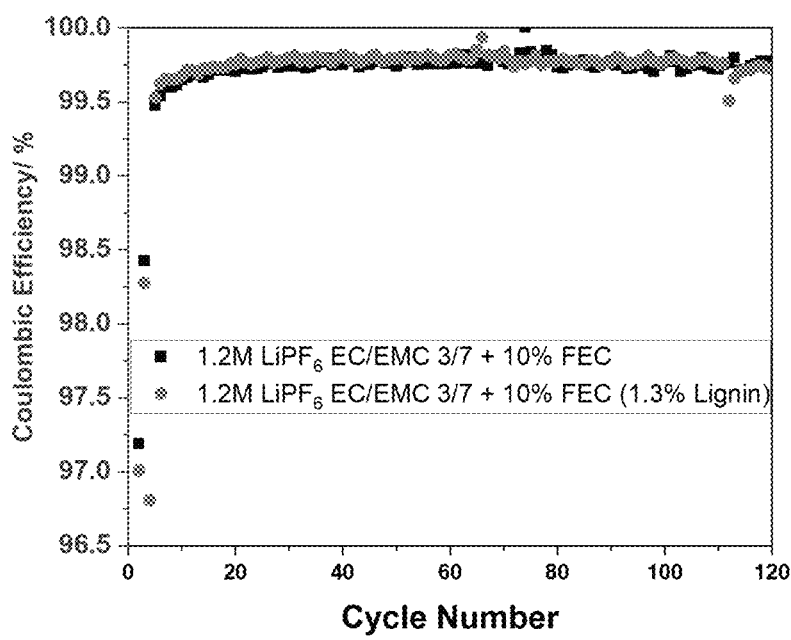

The benefit of using this new pre-lithiation method is unambiguously demonstrated by the cycling performance of Sid Lignin-NMC full cell. As presented in FIGS. 8A and 4b, the activated full cell shows around 3% increase in the initial specific discharge capacity compared to the full cell without any pre-lithiating reagent. A significant 6% increase in the specific capacity of the activated cell was observed after 30 cycles.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electrochemical cell comprising:
   an anode comprising silicon, a conductive carbon, a lithium titanate, lithium metal, or a combination of any two or more thereof;
   a separator;
   a cathode comprising a cathode active material and a lithiated polymeric redox active species either mixed into the cathode or coated onto the cathode; and
   an electrolyte comprising:
     a salt; and
     an aprotic solvent comprising a fluorinated ether solvent, a carbonate solvent, or a mixture thereof, with the proviso that the redox active species has substantially no solubility in the electrolyte;
   wherein:
   the cathode active material comprises a metal oxide;
   the electrochemical cell is pre-lithiated with the lithiated polymeric redox active species prior to any cycling of the electrochemical cell; and
   the lithiated polymeric redox active species is lithiated polyhydroquinone, lithiated polycatechol, lithiated polyaniline, lithiated polydopamine, or a compound represented by:

25
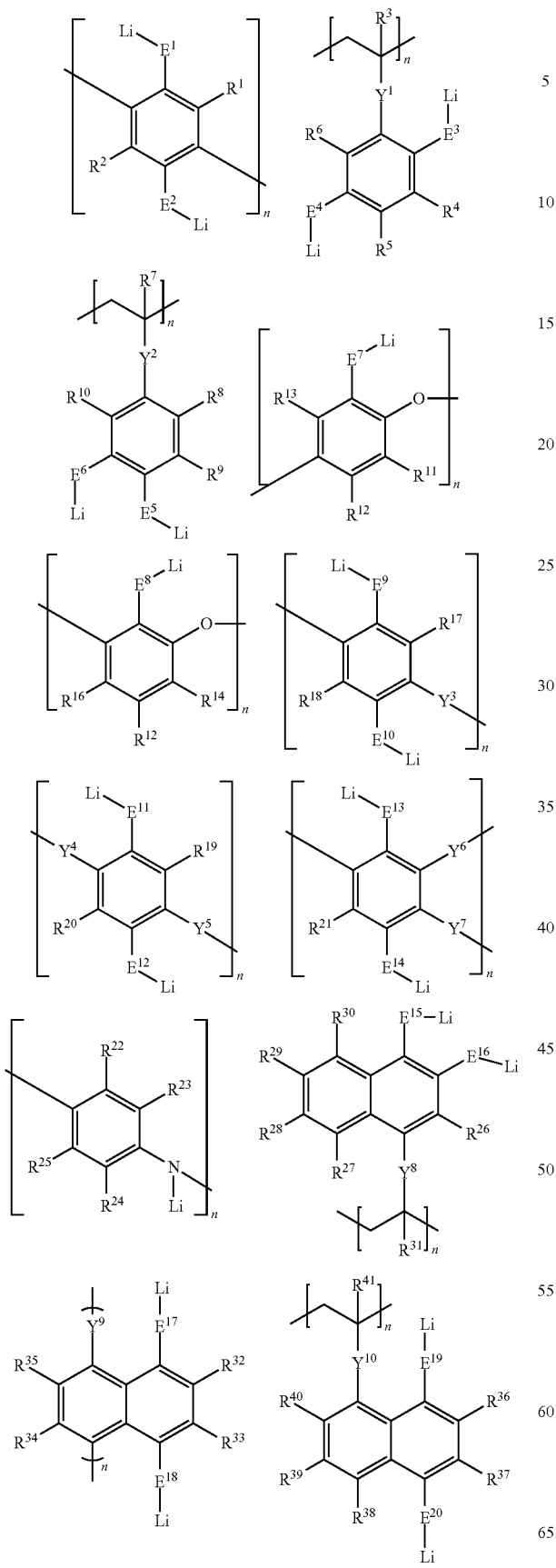
26
-continued
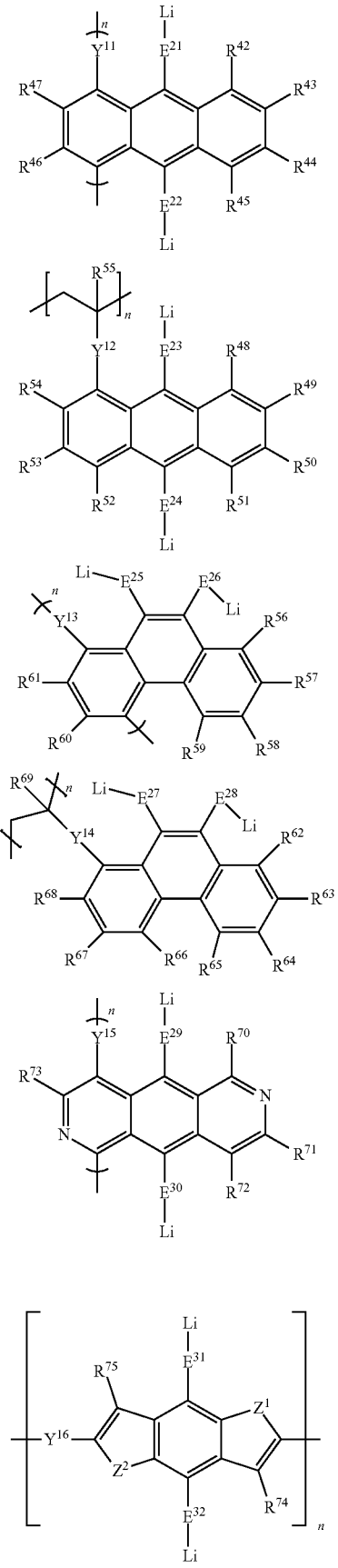

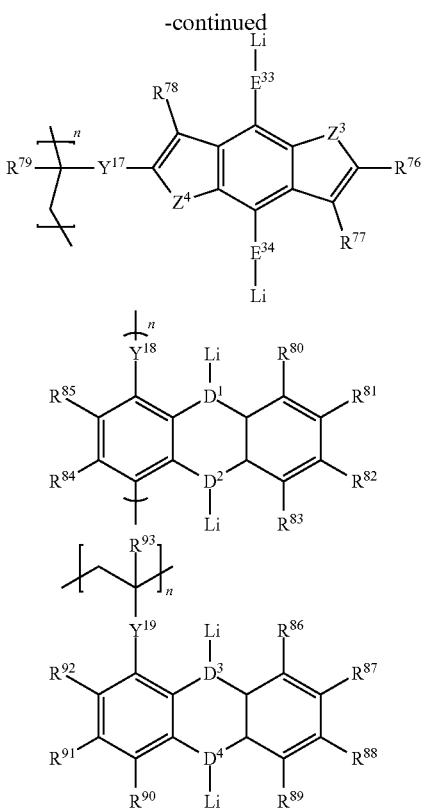

or a mixture of any two or more thereof;
wherein:
each of $R^1$ to $R^{93}$ is independently H, NO, F, Cl, Br, I, alkyl, alkoxy, haloalkyl, heteroalkyl, aryl, alkenyl, alkynyl, N(R), OP(R), OP(OR), C(O)R, C(O) OR, S(O) OR, or S(O) R;
R is alkyl;
each of $D^1$ to $D^4$ is independently O, S, S—O, S(=O), Se, NR', or PR';
each of $E^1$ to $E^{34}$ is independently O, S, S—O, S(=O), Se, NR', or PR'; and
R' is H, NO, F, Cl, Br, I, alkyl, alkoxy, haloalkyl, heteroalkyl, aryl, alkenyl, or alkynyl group;
each of $Y^1$-$Y^{19}$ is independently a C1 to C3 alkylene, —CO—, —COO—, CONR—, —O—, —S—, —NR—, —SO—, —SOO—, —SO$_2$O—, —SO$_2$NR—, —SONR—, —PR—, or —POR—; and
each of $Z^1$-$Z^4$ is independently S or O.

2. The electrochemical cell of claim 1, wherein the lithiated polymeric redox active species is mixed into a bulk of the cathode active material, comprises a coating on the surface of the cathode active material, or is both mixed into the bulk of the cathode active material and comprises a coating on the surface of the cathode active material.

3. The electrochemical cell of claim 1, wherein the electrolyte comprises the carbonate solvent and the salt is present at a concentration of greater than 3M.

4. The electrochemical cell of claim 1, wherein the electrolyte comprises the fluorinated ether solvent and the salt is present at a concentration of about 0.1 M to 5 M.

5. The electrochemical cell of claim 1, wherein the electrolyte comprises the mixture of the fluorinated ether solvent and the carbonate solvent and the salt is present at a concentration of 0.1 M to 5 M.

6. The electrochemical cell of claim 1, wherein the fluorinated ether solvent is 1,1,2,2-tetrafluoroethyl-2,2,2,3-tetrafluoropropyl ether (TTE), bis(2,2,2-trifluoroethyl) ether (BTFE), 1,1,2,2,-tetrafluoroethyl-2,2,2-trifluoroethyl ether (TFTFE), methoxynonafluorobutane (MOFB), or ethoxynonafluorobutane (EOFB).

7. The electrochemical cell of claim 1, wherein the carbonate solvent is propylene carbonate (PC), fluoroethylene carbonate (FEC), trifluoroethyl methyl carbonate (FEMC), dimethyl carbonate (DMC), ethylmethyl carbonate (EMC), diethyl carbonate (DEC), ethylene carbonate (EC), vinylene carbonate (VC), difluoroethylene carbonate (DFEC), or a combination of any two or more thereof.

8. The electrochemical cell of claim 1, wherein the fluorinated ether solvent and the carbonate solvent are present in a volume ratio of 10:90 to 90:10.

9. The electrochemical cell of claim 1, wherein the anode comprises carbon nanotubes, carbon fiber, microporous carbon, mesoporous carbon, macroporous carbon, mesoporous microbeads, graphite, expandable graphite, polymer yield carbon, or carbon black, $Li^0$, $Sb^0$, $Si^0$, Si—C, SiO, $Sn^0$, tin oxide, $Li_4Ti_5O_{12}$, a composite tin alloy, a transition metal oxide, a lithium metal nitride, phosphorous, a phosphorous-carbon composite, or a mixture of any two or more thereof.

10. The electrochemical cell of claim 1, wherein the aprotic solvent comprises monofluoroethylene carbonate (FEC), diethyl carbonate (DEC), ethylene carbonate (EC), ethylmethylcarbonate (EMC), dimethylcarbonate (DMC), propylene carbonate (PC), or a mixture of any two or more thereof.

11. The electrochemical cell of claim 10, wherein the aprotic solvent comprises FEC-DEC, FEC-EC-DEC, FEC-EMC, FEC-EC-EMC, EC-DMC, EC-DEC, EC-PC, EC-PC-DMC, EC-PC-DEC, or EC-DEC-DMC.

12. The electrochemical cell of claim 1, wherein the salt is a lithium salt, a sodium salt, an ammonium salt, an alkylammonium salt, a lithium polysulfide, or a lithium polyselenide.

13. The electrochemical cell of claim 1, wherein the cathode active material comprises a sodium-based spinel, an sodium-based olivine, $NaFePO_4$, $NaCoO_2$, $NaNiO_2$, $NaNi_{1-x}Co_yM^4{}_zO_2$, $NaMn_{0.5}Ni_{0.5}O_2$, $NaMn_{1/3}Co_{1/3}Ni_{1/3}O_2$, $NaMn_2O_4$, $NaFeO_2$, $NaM^4{}_{0.5}Mn_{1.5}O_4$, $Na_{1+x''}Ni_aMn_\beta Co_\gamma M^5{}_\delta O_{2-z''}F_{z''}$, $Na_2MnO_3$-$Na_dM_bM'_c M''_dO_e$, $Na_n{}'B^1{}_2(M_2O4)_3$ (Nasicon), $Na_2MSiO_4$, $NaVPO_4F$, or a mixture of any two or more thereof, wherein $M^2$ is P, S, Si, W, or Mo; $M^4$ is Al, Mg, Ti, B, Ga, Si, Mn, or Co; $M^5$ is Mg, Zn, Al, Ga, B, Zr, or Ti; M, M', and M'' are transition metals; $B^1$ is Ti, V, Cr, Fe, or Zr; $0 \le x \le 0.3$; $0 \le y \le 0.5$; $0 \le z < 0.5$; $0 \le m \le 0.5$; $0 \le n \le 0.5$; $0 \le x'' < 0.4$; $0 \le a \le 2$; $0 < b \le 1$; $0 \le c \le 1$; $0 \le d \le 1$; $0 \le \alpha \le 1$; $0 \le \beta \le 1$; $0 \le \gamma \le 1$; $0 \le \delta \le 1$; $0 \le \delta' \le 0.4$; $0 \le z'' \le 0.4$; $0 \le n' \le 3$; $0 < a+b+c+d$, and $0 < e$.

14. An electrochemical cell comprising:
an anode comprising silicon, a conductive carbon, a lithium titanate, lithium metal, or a combination of any two or more thereof;
a separator;
a cathode comprising a cathode active material and a redox active species either mixed into the cathode or coated onto the cathode; and
an electrolyte comprising:
a salt; and
an aprotic solvent comprising a fluorinated ether solvent, a carbonate solvent, or a mixture thereof, with the proviso that the redox active species has substantially no solubility in the electrolyte;

wherein:
the cathode comprises the redox active species prior to any cycling of the electrochemical cell; and
the redox active species is a compound of formula:
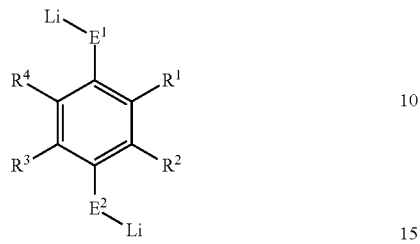
each of $R^1$, $R^2$, $R^3$, and $R^4$ are independently H, NO, F, Cl, Br, I, alkyl, alkoxy, haloalkyl, heteroalkyl, aryl, alkenyl, alkynyl, N(R), OP(R), OP(OR), C(O)R, C(O)OR, S(O) OR, or S(O) R;
R is alkyl; and
$E^1$ and $E^2$ are O.
* * * * *